United States Patent [19]
Yokota et al.

[11] Patent Number: 5,595,599
[45] Date of Patent: Jan. 21, 1997

[54] METHOD AND APPARATUS FOR SINTERING CEMENT CLINKER

[75] Inventors: Norio Yokota, Narashino; Nichitaka Sato, Funabashi; Katsuji Mukai, Nagareyama; Toshiyuki Ishinohachi, Tochigi-ken; Isao Hashimoto, Akashi; Mikio Murao, Kobe; Shozo Kanamori, Miki; Chikanori Kumagai, Kobe, all of Japan

[73] Assignees: Kawasaki Jukogyo Kabushiki Kaisha, Kobe; Sumitomo Cement Co., Ltd., Tokyo, both of Japan

[21] Appl. No.: 476,256

[22] Filed: Jun. 7, 1995

Related U.S. Application Data

[62] Division of Ser. No. 202,154, Feb. 25, 1994.

[30] Foreign Application Priority Data

| Feb. 26, 1993 | [JP] | Japan | 5-063138 |
| Mar. 31, 1993 | [JP] | Japan | 5-073890 |
| Mar. 31, 1993 | [JP] | Japan | 5-073909 |
| Mar. 31, 1993 | [JP] | Japan | 5-098485 |

[51] Int. Cl.$^6$ ............................................. C04B 7/45
[52] U.S. Cl. ........................................ 106/744; 106/757
[58] Field of Search ........................... 106/739, 744, 106/757; 432/58

[56] References Cited

U.S. PATENT DOCUMENTS

| 3,964,922 | 6/1976 | Nishida et al. | 106/759 |
| 4,094,626 | 6/1978 | Boyhont et al. | 432/106 |
| 4,759,711 | 7/1988 | Ichiyanagi et al. | 432/106 |
| 4,877,397 | 10/1989 | Tatebayashi et al. | 432/106 |

FOREIGN PATENT DOCUMENTS

| 0165034 | 12/1985 | European Pat. Off. |
| 0240304 | 10/1987 | European Pat. Off. |
| 2076745 | 9/1971 | France |
| 1502741 | 10/1987 | France |
| 1433913 | 12/1988 | Germany |
| 44-32193 | 12/1969 | Japan |
| 60-10198 | 1/1985 | Japan |
| 62-233677 | 10/1987 | Japan |
| 62-228875 | 10/1987 | Japan |
| 62-225888 | 10/1987 | Japan |
| 63-61883 | 3/1988 | Japan |
| 63-60134 | 3/1988 | Japan |
| 1-254242 | 10/1989 | Japan |
| 1-284509 | 11/1989 | Japan |
| 2-229745 | 9/1990 | Japan |
| 4-110395 | 9/1992 | Japan |
| 2113112 | 8/1983 | United Kingdom |

*Primary Examiner*—Anthony Green
*Attorney, Agent, or Firm*—Leydig, Voit & Mayer

[57] ABSTRACT

A method of sintering cement clinker is provided including the steps of introducing raw material for cement to a spouted fluidized bed granulating furnace which includes a perforated distributor having a plurality of nozzle holes; passing fluidizing gas through at least one of the plurality of nozzle holes into the spouted fluidized bed granulating furnace while simultaneously blowing classifying gas at a selected flow velocity that is different from the flow velocity of the fluidizing gas into the spouted fluidized bed granulating furnace through a dropping port arranged facing and between the fluidized bed of the spouted fluidized bed granulating furnace and in communication with a fluidized bed sintering furnace; granulating the raw material in the spouted fluidized bed granulating furnace; discharging granules formed in the spouted fluidized bed granulating furnace into the fluidized bed sintering furnace while classifying the granules with the classifying gas; and sintering the granules injected into the fluidized bed sintering furnace through the dropping port.

3 Claims, 18 Drawing Sheets

FIG. 6A
FIG. 6B
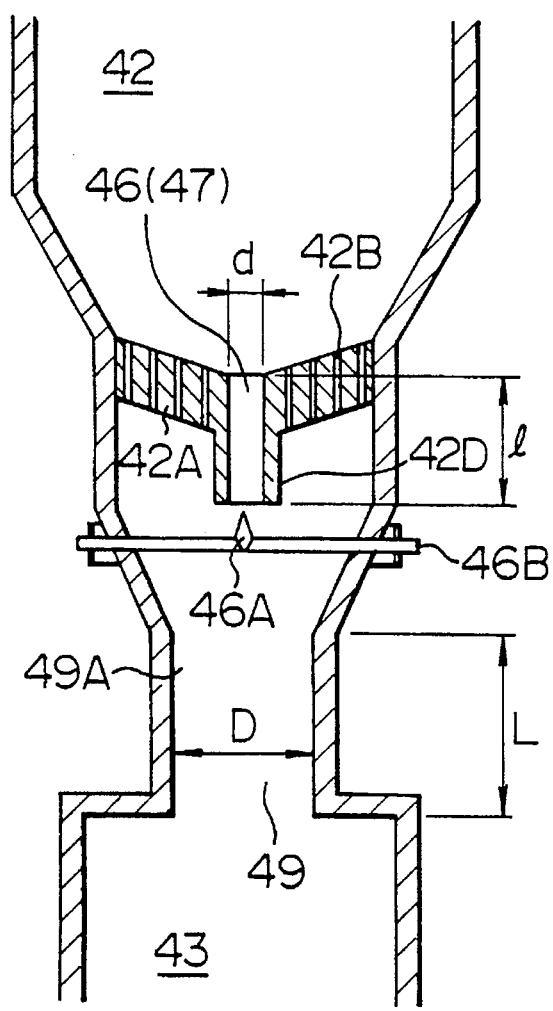
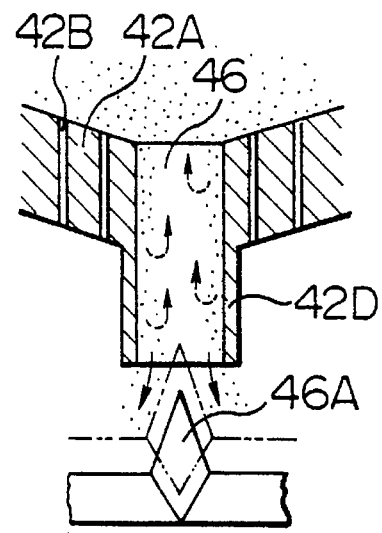

METHOD AND APPARATUS FOR SINTERING CEMENT CLINKER

This application is a division of patent application Ser. No. 08/202,154, filed Feb. 25, 1994.

BACKGROUND OF THE INVENTION

Field of the Invention

A first aspect of the present invention relates to a method of sintering cement clinker of a type using a spouted-type fluidized bed granulating furnace and a fluidized bed sintering furnace and a sintering apparatus for use to embody the sintering method.

A second aspect of the present invention relates to an apparatus for discharging granules from a fluidized bed for cement clinker, such as a spouted-type fluidized bed granulating furnace or a fluidized bed sintering furnace.

A third aspect of the present invention relates to a cement clinker sintering apparatus having an improved discharge chute for injecting, into a sintering furnace, substances granulated in a granulating furnace of a spouted bed type or a spouted-type fluidized bed type or a fluidized bed type.

A fourth aspect of the present invention relates to an apparatus for sintering cement clinker comprising an improved discharge chute of a granulating furnace of a spouted bed type or a spouted-type fluidized bed type or a fluidized bed type.

Cement clinker is manufactured in such a manner that raw material powder obtained by blending and grinding limestone or quartz sand is first granulated and then it is sintered and cooled. In recent years, the cement clinker has been usually manufactured by using a sintering apparatus comprising a spouted-type fluidized bed granulating furnace and a fluidized bed sintering furnace. The reason for this is that the cement sintering apparatus using the fluidized bed furnace exhibits excellent heat efficiency and advantages in terms of reducing required installation space, realizing a satisfactory fuel consumption and preventing harmful gases (NOX and CO2 and so forth) as compared with a conventional rotary kiln type sintering apparatus. Moreover, the foregoing furnace is considered suitable to manufacture many types of products in a small quantity. In addition, an apparatus of the foregoing type comprising the two furnaces as the essential portion thereof enables the granulating process and the sintering process to be individually controlled, causing an advantage to be obtained in that cement clinker exhibiting excellent quality can be manufactured.

In the spouted-type fluidized bed granulating furnace, raw material powder, which has been previously heated and injected to the same, is fluidized by hot gas so that a portion of the fluidized raw material powder present adjacent to the surface is, with heat, melted and allowed to adhere mutually as to be allowed to grow to granules (granulated substances) having a diameter of several millimeters. However, the size of each granule (that is, the granule size) must adequately be arranged to be adaptable to the specifications of the facility and type of desired cement. If the granule size is too large, the granulated substances cannot easily be fluidized in the granulating furnace and the ensuing sintering furnace, causing a problem to arise in that burning and sintering and the like cannot properly be performed. If the granule size is too small, the adhesion of the granules proceeds excessively in the sintering furnace, and therefore an undesirable phenomenon that is so called agglomeration takes place. As a result the quality of the cement clinker deteriorates and, what is worse, the operation of the sintering apparatus (for example, control of the temperature) cannot easily be performed and the heat efficiency deteriorates.

Under these circumstances, it is necessary that a portion of the substances granulated in the granulating furnace that has been enlarged to have granule sizes larger than a predetermined size must be classified and injected into the sintering furnace. A classifying means of the foregoing type has been disclosed in Japanese Patent Unexamined Publication No. 62-228875. According to this disclosure, a granulating furnace formed into a spouted bed type (a type of fluidized bed) and a fluidized bed sintering furnace are directly connected to each other while interposing a throat portion (a passage through which spouted gas flows) to adequately control the velocity of the spouted gas flow from the sintering furnace to the granulating furnace. As a result, only granules that have a granule size larger than a predetermined size are dropped from the granulating furnace to the sintering furnace by way of the throat portion to improve the classifying efficiency.

A sintering apparatus of a type that has not two furnaces for granulating and sintering has been disclosed in Japanese Patent Publication No. 44-32193, the apparatus being arranged in such a manner that an extracting chute having a function capable of classifying granules (sintered granules) is disposed on a center line passing in the lower portion of the furnace body (a sintering furnace also serving as a granulating furnace).

The foregoing two disclosed structures cannot enable satisfactory results to be obtained in terms of the controllability of the granule size and quality of the granules. Experiments and studies recently performed by the inventors of the present invention resulted in the knowledge that the means according to the former disclosure (Japanese Patent Unexamined Publication No. 62-228875) is insufficient to accurately classify granules to satisfy the quality level desired recently because an excessively large quantity of granules drops (so called "direct drop) from the throat portion to the sintering furnace even if granules smaller than a predetermined granule size are present. The reason for this can be considered as follows: since the throat portion serving as a passage through which gas for forming the spouted bed flows has a large diameter (hundreds of millimeters), the velocities of gas flowing in the cross section of the throat portion are distributed (deviated) considerably. Further, commencement of the drop causes the gas velocity in the throat to be changed. Therefore, it is difficult to uniformly classify the granulated substances with respect to a predetermined granule size. Since the latter technology (Japanese Patent Publication No. 44-32193) is arranged in such a manner that granulating and sintering are performed in one furnace, the quality of the products is inferior to that obtainable from a typical sintering apparatus (having no classifying function) comprising the two furnaces regardless of the classifying precision. Further, the granule extracting chute, which can be disposed in a relatively low temperature portion in the one-furnace-type apparatus, must be disposed in a hot portion of about 1300° C. in the two-furnace-type apparatus. Therefore, the technology of the foregoing disclosure cannot easily be adapted to the two-furnace-type sintering apparatus (a first problem).

As an apparatus for discharging granules from a spouted bed furnace, such as a spouted-type fluidized bed granulating furnace or a fluidized bed sintering furnace, the following apparatus is exemplified:

For example, a structure (of a so-called "bottom flow type") has been suggested which is, as shown in FIG. 15, constituted in such a manner that the granules are injected from a discharge chute 104 disposed in the side wall adjacent to the bottom of a granulating furnace 103 into a fluidized bed sintering furnace 107 disposed below the granulating furnace 103 by way of a discharge chute 105 and a so-called L-valve 106 (hermetic discharge apparatus).

However, the foregoing structure causes the granules in the discharge chute to not move actively in a manner similar to those in the granulating furnace bed but form a moving bed, resulting in that the granules which are partially melted with heat are allowed to adhere together in the discharge chute adjacent to a discharge port. Moreover, adhesion of the granules to the wall surface of the discharge-chute causes the discharge chute to be blocked, resulting in that the discharge of the granules cannot be stably maintained. As a result, there arises a problem in that the operation cannot be stably performed.

As a structure for injecting granules graded in the granulating furnace 103 into the fluidized bed sintering furnace 107, structures respectively disclosed in Japanese Patent Publication No. 44-32193 and Japanese Patent Unexamined Publication No. 62-228875 have been suggested. Each of the foregoing structures is arranged in such a manner that the throat portion between the granulating furnace 103 and the fluidized bed sintering furnace 107 is used as a discharge port or a discharge port is formed to adjust the flow velocity so as to selectively drop large granules into the sintering furnace 107.

However, the foregoing structures encounter reduction in the flow rate of air in the discharge port with the commencement of dropping of large granules, causing all granules in the granulating furnace 103 to be undesirably dropped into the sintering furnace 107. Further, the control becomes too complicated.

In order to overcome the foregoing problems, a group including the applicant of the present invention has applied an apparatus for sintering cement clinker arranged in such a manner that one nozzle hole of a perforated distributor disposed in the throat portion is used as a passage through which the granules drop and a means for controlling the quantity of spouted gas passing through the nozzle hole is provided as exemplified by a gate which can be opened/closed and which is disposed in the opening portion at the lower end of the nozzle hole (Japanese Patent Application No. 4-360488).

However, the foregoing apparatus is arranged in such a manner that the gate is opened/closed to control the flow velocity to enable the granules to be discharged intermittently sometimes encounters a problem in that the granules are allowed to adhere to the nozzle hole at the time of closing the gate, resulting in a problem to arise in that the function as the discharge apparatus cannot be exhibited sometimes (a second problem).

Hitherto, an apparatus for sintering cement clinker has employed a structure as shown in FIG. 17. That is, raw material powder for cement injected through a raw material injection chute 201 is previously heated by a suspension pre-heater 202 composed of cyclones $200C_1$, $200C_2$ and $200C_3$ when the raw material powder for cement sequentially passes through the cyclones $200C_1$, $200C_2$ and $200C_3$. The pre-heated raw material for cement is injected into a granulating furnace 203 of a fluidized bed type or a spouted bed type, and granules granulated in a fluidized manner or a spouted manner in the granulating furnace 203 are injected into a fluidized bed sintering furnace 207 disposed below the granulating furnace 203. The granules sintered in the fluidized bed sintering furnace 207 as described above are allowed to pass through a fluidized bed cooler 208 and a moving bed cooler 209 as to be recovered finally as cement clinker. It should be noted that reference numeral $200A_1$ represents a heavy oil supply line.

In order to inject the granules granulated in the granulating furnace 203 into the fluidized bed sintering furnace 207, structures respectively disclosed in Japanese Patent Publication No. 44-32193 and Japanese Patent Unexamined Publication No. 62-228875 have been suggested. The foregoing structures are arranged such that the throat portion between the granulating furnace 203 and the fluidized bed sintering furnace 207 is used as a discharge port or a discharge port is formed to adjust the flow velocity so as to selectively drop large granules into the sintering furnace 207.

However, the foregoing structures encounter reduction in the flow rate of air in the discharge port with the commencement of dropping of large granules, causing all granules in the granulating furnace 203 to be undesirably dropped into the sintering furnace 207. Further, the control becomes too complicated.

In order to overcome the foregoing problems, a structure (of a so-called "bottom flow type") has been suggested which is, as shown in FIG. 18, constituted in such a manner that granules are injected from a discharge hole 204 formed in the side wall adjacent to the bottom portion of the granulating furnace 203 into the fluidized bed sintering furnace 207 disposed below the granulating furnace 203 by way of the discharge chute 205 and a so-called L-valve (a hermetic discharge apparatus). The foregoing structure employs a structure for preventing blockage of the discharge chute, the structure being constituted in such a manner that the discharge chute 205 and the portion adjacent to the discharge port of the furnace are indirectly cooled by a cooling jacket 204*a* into which a cooling medium, such as air or water, is introduced by blowing or the same is directly cooled (refer to Japanese Patent Unexamined Publication No. 62-233677 and so forth).

However, the foregoing structure causes the granules in the discharge chute to not move actively in a manner similar to those in the granulating furnace bed but form a moving bed, resulting in that the granules, partially melted with heat, are allowed to adhere mutually in the discharge chute adjacent to the discharge port. Moreover, adhesion of the granules to the wall surface of the discharge chute causes the discharge chute to be blocked, resulting in that the discharge of the granules cannot be stably maintained. As a result, there arises a problem in that the operation cannot be stably performed. That is, direct or indirect cooling of the wall surface of the discharge chute cannot cool all granules. What is worse, mixture with granules in the granulating furnace bed inhibits satisfactory cooling of the granules in the discharge chute, causing a problem to arise in that the blockage cannot completely be prevented (a third problem).

As another conventional technology, an apparatus for sintering cement clinker has been disclosed in, for example Japanese Patent Unexamined Publication No. 62-233677. According to the foregoing disclosure, there has been suggested an apparatus arranged in such a manner that raw material powder for cement, previously heated by a preheating means, composed of a suspension pre-heater is injected into a spouted bed type or a spouted-type fluidized bed or a fluidized bed type granulating furnace as shown in FIG. 19 as to be granulated, and the granules are, by way of a discharge chute connected to the granulating furnace bed, injected into a fluidized bed sintering furnace as to be sintered, wherein a chute for discharging hot granules graded in the granulating furnace or the chute and the portion adjacent to the discharge port formed in the granulating furnace are directly or indirectly cooled by a cooling medium so as to prevent blockage of the discharge chute by the granules (see, for example, Japanese Patent Unexamined Publication No. 62-233677).

The foregoing conventional disclosure about a discharge apparatus arranged in such a manner that the discharge port is formed in the bed of the granulating furnace is shown in FIG. 19, and the granules are charged into the discharge chute and the granules are injected into the sintering furnace by way of the L-valve (the hermetic discharge apparatus) while maintaining a material seal results in the granules in the discharge chute not actively moving similar to those in the bed in the granulating furnace. The granules partially melted with heat for the purpose of forming a moving bed are allowed to mutually adhere in the discharge chute adjacent to the discharge port, and granules allowed to adhere to the wall surface of the discharge chute block the discharge chute. As a result, there arises a problem in that a stable discharge flow of granules cannot be maintained, and therefore the operation cannot be stably performed. As described above, the structure comprising the discharge port formed in the bed of the granulating furnace encounters the unsatisfactory limitation of the granules that can be cooled even if the granules present adjacent to the discharge port are cooled directly with cooling air or the same is indirectly cooled while interposing the wall surface of the discharge chute. What is worse, mixture with the granules in the bed of the granulating furnace inhibits satisfactory cooling of the granules in the discharge chute, and accordingly a problem arises in that the prevention of the blockage cannot completely be performed (a fourth problem).

SUMMARY OF THE INVENTION

An object of a first aspect of the present invention is to provide a method and an apparatus for sintering cement clinker which performs a reliable classification as to precisely control the granule size and which is capable of smoothly manufacturing high quality cement clinker.

A method of sintering cement clinker according to a first aspect of the present invention uses a fluidized bed granulating furnace and a fluidized bed sintering furnace and causes granules to be injected into the latter furnace through a dropping port facing a fluidized bed of the former furnace so that cement clinker is sintered, the method comprising the steps of: blowing gas through the dropping port into the fluidized bed granulating furnace at a predetermined flow velocity that is different from a flow velocity of fluidizing gas passing through another opening and introduced into the fluidized bed granulating furnace; and classifying, with the gas, the granules to be injected into the sintering furnace.

An apparatus for sintering cement clinker according to the first aspect of the present invention is an apparatus having a fluidized bed sintering furnace below the distributor of a spouted-type fluidized bed granulating furnace and causes granules to be injected into the latter furnace through a dropping port facing a fluidized bed of the former furnace so that cement clinker is sintered, the apparatus comprising ventilating means capable of blowing gas through the dropping port into the spouted-type fluidized bed granulating furnace at a predetermined flow velocity which is different from the flow velocity of the fluidizing gas to be introduced into the spouted-type fluidized bed granulating furnace. It is preferable that the apparatus is arranged in such a manner that an injection chute disposed from the dropping port to the fluidized bed sintering furnace has a throttle portion for upwards blowing the classifying gas at a predetermined flow velocity.

The method of sintering cement clinker according to the first aspect of the present invention is arranged in such a manner that granules are injected into the fluidized bed sintering furnace while classifying the same through the dropping port facing the fluidized bed of the spouted-type fluidized bed granulating furnace, the method being characterized as follows: the first characteristic is that the cross sectional area of the dropping port can be reduced as compared with the foregoing throat portion because the fluidizing gas does not pass through only the dropping port (the gas is introduced into the furnace through another opening). Therefore, the gas flow velocity in the cross section cannot easily involve deviation, and therefore the classifying accuracy can be improved. The second characteristic is that the classifying granule size can be set individually from the conditions under which the granulating furnace and the sintering furnace are operated because the flow velocity of the gas blowing through the dropping is set individually from the flow velocity of the fluidizing gas passing through another opening. Further, the classifying accuracy can easily be maintained while preventing an influence of disturbance.

Since the sintering method uses the spouted-type fluidized bed granulating furnace and the fluidized bed sintering furnace, the quality of granulated and sintered cement clinker can be improved.

The apparatus for sintering cement clinker according to the first aspect of the present invention assuredly embodies the foregoing sintering method. That is, the spouted-type fluidized bed granulating furnace has the distributor (the perforated plate) so that a major portion of the fluidizing gas passes through the nozzles (holes) of the distributor before it is introduced into the granulating furnace. Therefore, it is necessary to use the dropping port as the main passage through which the fluidizing gas is allowed to pass. As a result, the cross sectional area of the dropping port can be reduced. Further, the ventilating means enables the gas blowing through the dropping port to be determined individually from the fluidizing gas to correspond to the classified granule size. Therefore, the foregoing apparatus enables granules to be easily and precisely classified at the foregoing dropping port. As a result, high quality cement clinker can be obtained. The dropping port may be formed in an arbitrary portion as well as the central portion of the distributor (the furnace body). For example, it may be formed in the side portion or an upper portion (the overflow portion) of the fluidized bed above the distributor. Therefore, problems due to the fact the dropping port and the injection chute and so forth are heated by the gas passing from the sintering furnace to the granulating furnace can easily be overcome.

The sintering apparatus having the throttle portion enables the granules to be subjected to a so-called second classification with the gas blown in the throttle portion formed at an intermediate portion in the passage which reaches the sintering furnace. That is, granules smaller than a predetermined granule size among the granules introduced into the dropping port are blown back to the granulating furnace by way of the dropping port so as to be selected again. Since the second classification can be performed as described above, further precise classification can be performed in the foregoing apparatus and a satisfactory influence is made upon the quality of cement clinker.

The conventional technology suffering from the second problem encounters the problem that discharged granules cannot be continuously and stably discharged, and the discharged granules cannot be classified. An object of a second aspect of the present invention is to provide a granule discharge apparatus for a spouted-type fluidized bed granulating furnace.

The second aspect of the present invention is directed to overcome the problems experienced with the conventional technology and to achieve the foregoing object. The apparatus according to the second aspect of the present invention is an apparatus for discharging granules from a spouted-type fluidized bed furnace, the apparatus being arranged in such a manner that a perforated distributor having a multiplicity of nozzle holes is disposed in the bottom portion of the spouted-type fluidized bed furnace, spouted gas is blown upwards into the spouted-type fluidized bed furnace through the distributor to fluidize, granule and sinter the substances injected into the spouted-type fluidized bed furnace, and the apparatus comprises a bypass passage formed from the side wall of at least one nozzle hole in the distributor to the top end of the distributor, and a gate means capable of opening/closing the top end opening in the distributor in the bypass passage as to adjust the flow velocity of granules passing through the nozzle hole by opening/closing the gate means so that granules in the spouted-type fluidized bed furnace can selectively be classified and discharged downwards.

The apparatus according to the second aspect of the present invention is an apparatus for discharging granules from a spouted-type fluidized bed furnace, the apparatus being arranged in such a manner that a perforated distributor having a multiplicity of nozzle holes is disposed in the bottom portion of the spouted-type fluidized bed furnace, spouted gas is upwards blown into the spouted-type fluidized bed furnace through the distributor to fluidize, granules and sinter the substances injected into the spouted-type fluidized bed furnace, and the apparatus comprises an inverse truncated portion, that is, a cone portion formed by opening the top end of at least one of nozzle holes formed in the distributor, a bypass passage formed from the side wall of the nozzle hole at a position below the cone portion of the nozzle hole to the top end of the distributor, and gate means capable of opening/closing the top end opening in the distributor in the bypass passage as to adjust the flow velocity of granules passing through the nozzle hole by opening/closing the gate means so that granules in the spouted-type fluidized bed furnace can selectively be classified and discharged downwards.

The second aspect of the present invention is characterized in that the foregoing granule discharge apparatus is structured such that air can be spouted through the top surface of the gate means.

The second aspect of the present invention is characterized in that the foregoing granule discharge apparatus comprises the gate means capable of opening/closing the top opening in the cone portion.

Since the cone portion formed at the top end of the nozzle hole in the distributor forms a small fluidized bed in the granule discharge apparatus of the spouted-type fluidized bed granulating furnace according to the second aspect of the present invention, the flow velocity of the spouted gas passing through the nozzle hole is somewhat decreased. By further decreasing the flow velocity of the spouted gas passing through the nozzle hole by adjusting the degree of opening at the top end of the distributor of the bypass passage, granules in the spouted-type fluidized bed furnace that have granule sizes corresponding to the flow velocity drop through the nozzle hole against the flow velocity so as to be classified and discharged.

In order to overcome the third problem, an object of a third aspect of the present invention is to provide an apparatus for sintering cement clinker having a structure comprising a so-called conventional bottom flow type discharge chute, the apparatus being capable of uniformly cooling discharged granules to a temperature (1200° C. or lower) at which adhesion of the granules in the discharge chute can be prevented, preventing mixture of granules with the bed of the granulating furnace, and therefore capable of effectively preventing mutual adhesion of granules and blockage of the discharge chute occurring due to the adhesion of the granules to the wall surface of the discharge chute so that granules can smoothly be supplied to the sintering furnace and the operation be stabilized.

A third aspect of the present invention is directed to overcome the problems experienced with the conventional technology and to achieve the object, the third aspect of the present invention is characterized by an apparatus for sintering cement clinker arranged in such a manner that pre-heating means, such as a suspension pre-heater, is used to previously heat raw material for cement, the raw material is injected into a granulating furnace so as to be granulated, granules granulated in the granulating furnace are taken out through a bottom flow discharge port formed in the side wall adjacent to the bottom portion of the granulating furnace, the granules are injected into a sintering furnace by way of a discharge chute connected to the bottom flow discharge port and a discharge chute as to be sintered so that cement clinker is obtained, the apparatus for sintering cement clinker comprising a plug mechanism which can be opened/closed with respect to the bottom flow discharge port, wherein the discharge chute connected to the bottom flow discharge port is formed into a fluidized bed cooler structure for fluidizing and cooling granules discharged through the bottom flow discharge port.

The third aspect of the present invention is characterized by an apparatus for sintering cement clinker arranged in such a manner that pre-heating means, such as a suspension pre-heater, is used to previously heat raw material for cement, the raw material is injected into a granulating furnace as to be granulated, granules granulated in the granulating furnace are taken out through a bottom flow discharge port formed in the side wall adjacent to the bottom portion of the granulating furnace, the granules are injected into a sintering furnace by way of a discharge chute connected to the bottom flow discharge port and a discharge chute as to be sintered so that cement clinker is obtained, wherein the discharge chute connected to the bottom flow discharge hole is formed into a fluidized bed cooler structure, means for detecting the pressure difference in the fluidized bed cooler structure is disposed, and opening and closing of the plug can be so controlled as to make the bed pressure difference to be included in a predetermined range.

The third aspect of the present invention is characterized by an apparatus for sintering cement clinker arranged in such a manner that pre-heating means, such as a suspension pre-heater, is used to previously heat raw material for cement, the raw material is injected into a granulating furnace as to be granulated, granules granulated in the granulating furnace are taken out through a bottom flow discharge port formed in the side wall adjacent to the bottom portion of the granulating furnace, the granules are injected into a sintering furnace by way of a discharge chute connected to the bottom flow discharge port and a discharge chute so as to be sintered so that cement clinker is obtained, wherein the discharge chute connected to the bottom flow discharge hole is formed into a small size fluidized bed cooler structure, temperature detection means for detecting the bed temperature of the small size fluidized bed cooler structure is disposed, and a flow quantity control valve for adjusting the quantity of cooling air to be blown in the small size fluidized bed cooler structure as to the temperature at which adhesion in the discharge chute can be prevented is disposed.

A fourth aspect of the present invention is to provide an apparatus for sintering cement clinker arranged in such a manner that granules discharged in an overflow manner are fluidized with blown air as to be uniformly cooled so that mutual adhesion of granules and adhesion of the granules to the wall surface of the discharge chute are prevented.

In order to overcome the problems experienced with the conventional technology, according to a fourth aspect of the present invention, there is provided an apparatus for sintering cement clinker in which raw material for cement previously heated by pre-heating means, such as a suspension pre-heater, is injected into a granulating furnace as to be granulated, and the granules are injected into a sintering furnace by way of a discharge chute as to be sintered, the apparatus for sintering cement clinker comprising an overflow discharge port for discharging granules formed in the granulating furnace, wherein the discharge chute connected to the overflow discharge port is formed into a small size fluidized bed cooler structure having means for fluidizing and cooling the overflow granules.

The granules granulated in the granulating furnace and overflow-discharged are uniformly fluidized and cooled to temperature (1200° C.) at which generation of liquid phase in the discharge chute can be prevented due to the effect of the small size fluidized bed cooler structure so that mutual adhesion of granules and adhesion of granules to the wall surface of the discharge chute are prevented, and therefore the granules are smoothly supplied to the sintering furnace by way of the discharge apparatus.

Other and further objects, features and advantages of the invention will be appear more fully from the following description.

BRIEF DESCRIPTION OF THE DRAWINGS

FIG. 6A is a vertical cross sectional view which illustrates an essential portion of an apparatus for sintering cement clinker according to a fifth embodiment of the first aspect of the present invention;

FIG. 6B is a partially enlarged view which illustrates the same;

DESCRIPTION OF THE PREFERRED EMBODIMENTS

Figure 1A:
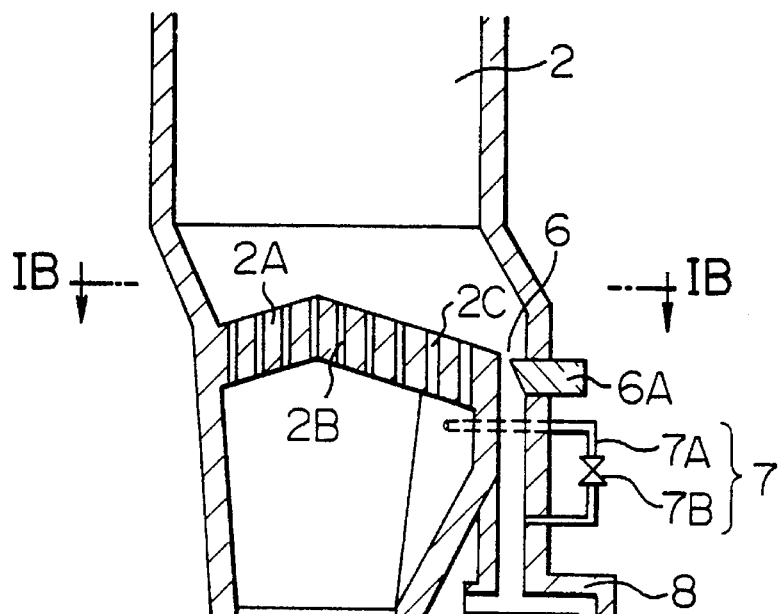
FIG. 1A is a vertical cross sectional view which illustrates a spouted-type fluidized bed granulating furnace and a fluidized bed sintering furnace of an apparatus for sintering cement clinker according to a first aspect of the present invention.
Figure 1B:
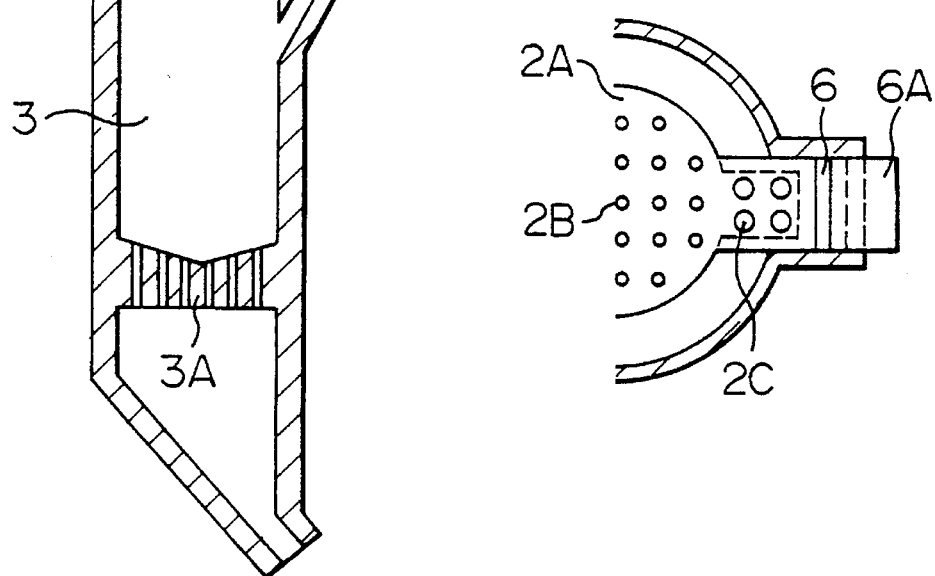
FIG. 1B is a cross sectional view taken along line B—B of FIG. 1A.
Figure 2:
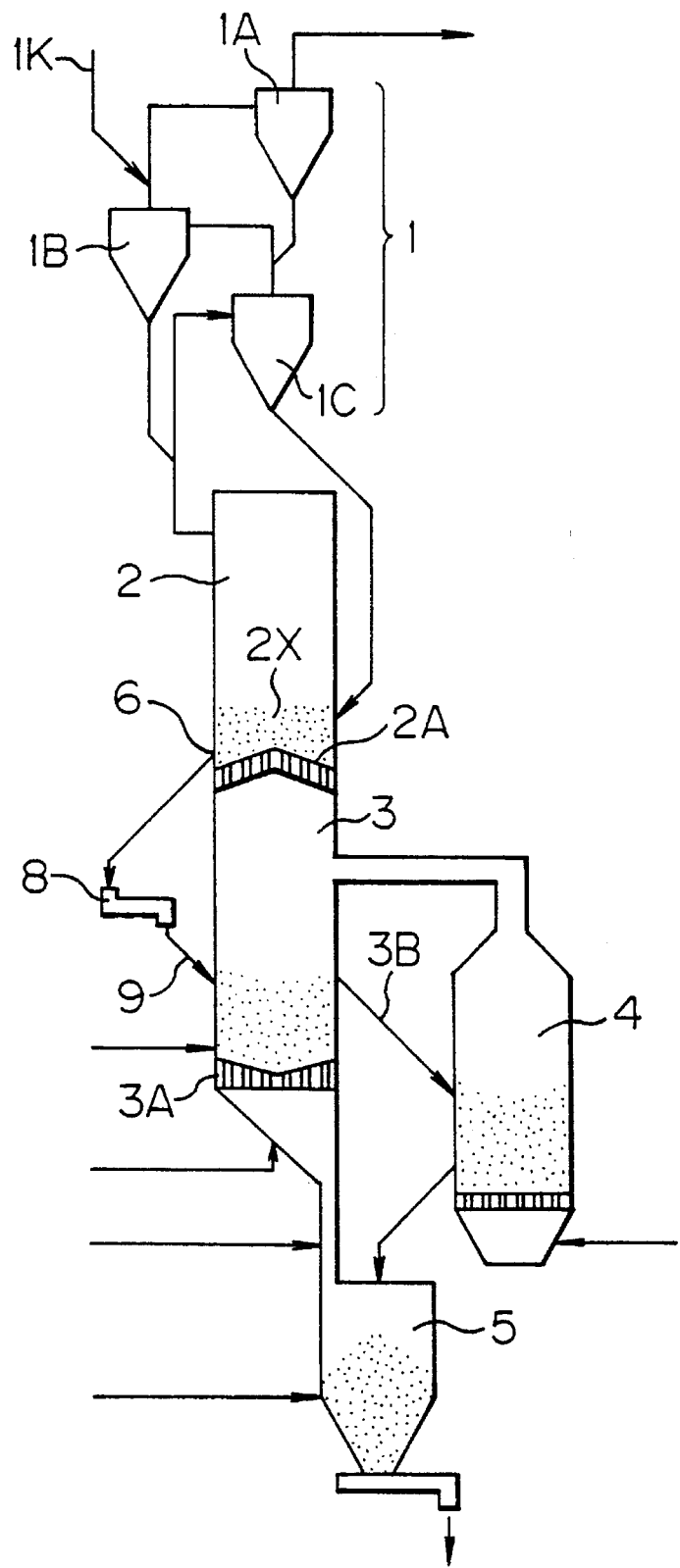
FIG. 2 is an overall system view which illustrates the sintering apparatus including the granulating furnace and the sintering furnace shown in FIG. 1A.

An apparatus for sintering cement clinker according to a first embodiment of the first aspect of the present invention is shown in FIGS. 1A and 1B. FIG. 1A is a vertical cross sectional view which illustrates a container of a type integrating a spouted-type fluidized bed granulating furnace 2 and a fluidized bed sintering furnace 3. FIG. 2 is an overall system view which illustrates the sintering apparatus including the container.

Referring to FIG. 2, reference numeral 1 represents a three-stage suspension pre-heater including cyclones 1A to 1C. Reference numeral 2 represents the spouted-type fluidized bed granulating furnace, 3 represents a fluidized bed sintering furnace, and 4 and 5 represent cooling units (coolers). Among the foregoing furnaces, the granulating furnace 2, the sintering furnace 3 and the primary cooling unit 4 employ the fluidized bed type structure, while the secondary cooling unit 5 is formed into a moving bed type structure. The granulating furnace 2 and the sintering furnace 3 are directly connected with each other, the former furnace being positioned above the latter furnace so as to be formed into an integrated container (see FIG. 1A). Further, distributors (perforated plates) 2A and 3A are disposed in the corresponding granulating furnace 2 and the sintering furnace 3.

The foregoing sintering apparatus is usually operated as follows: raw material powder for cement injected from an injection chute 1K into the system is allowed to pass through the suspension pre-heater 1 (the cyclones 1A to 1C) so as to be heated, and then injected into the granulating furnace 2. The raw material powder is granulated to granules having sizes about several millimeters in a fluidized bed 2X of the granulating furnace 2, the granules being then injected from a plurality of dropping ports 6 facing the fluidized bed 2X and opened in the side surface of the distributor 2A into the sintering furnace 3 by way of an injection chute 9. The granules sintered in the sintering furnace 3 are supplied from a supply pipe 3B (omitted from illustration in FIG. 1A) to the cooling unit 4 as to be cooled primarily. Further, the granules are cooled secondarily, and then recovered as cement clinker. On the other hand, hot air discharged from the cooling units 4 and 5 is allowed to pass through the sintering furnace 3 so as to be sent to the granulating furnace 2 and the suspension pre-heater 1.

The foregoing sintering apparatus is arranged to limit the size of the granules to be supplied from the granulating furnace 2 to the sintering furnace 3 to be larger than a predetermined size by constituting the structure in such a manner that the dropping ports 6 and portions around the dropping ports 6 are caused to have a classifying function. That is, a portion of the granules among those which are introduced into the dropping ports 6 and having sizes larger than a predetermined size (for example, 2 mm) are blown back into the furnace (on to the distributor 2A) with air flows moving upwards to the dropping ports 6. Only the granules having the sizes that are not blown back are sent to the sintering furnace 3 by way of the dropping ports 6. The foregoing structure will now be described in detail.

(1) As shown in FIG. 1A, the top surface of the distributor 2A is formed into a conical surface making an angle of 0° to 30° toward each dropping port 6 so that the granules are allowed to grow to have a size which cannot be fluidized with hot air blown up from a nozzle 2B are rolled toward the dropping ports 6.

(2) A portion of the distributor 2A adjacent to the dropping ports 6 has a nozzle 2C (see FIG. 1B) having a holes 3 larger than those formed in the nozzle 2B in the other portion. Since the flow velocity of hot air blown up from the large-diameter nozzle 2C is higher than the velocity of the flow from the other nozzle 2B, small granules, among them being those which are being rolled or fluidized adjacent to the dropping ports 6, are blown back into the furnace with hot air blown up through the nozzle 2C so that the foregoing granules can previously be moved away from the dropping ports 6.

(3) An L-valve 8, which is a known hermetic discharge means, is connected between the dropping port 6 and the injection chute 9. The L-valve 8 causes the granules to be deposited temporarily in the inside portion so as to interrupt the ventilation due to the material seal effect of the granules. Further, the granules are discharged by pushing with compressed air or a mechanical means (omitted from illustration). As a result of the foregoing element, upward flow of hot air from the sintering furnace 3 by way of the injection chute 9 can be prevented so that the granules are smoothly injected into the sintering furnace 3.

(4) The dropping port 6 is provided with a gate 6A which can be injected/ejected through the side surface of the furnace to increase/decrease the opening area of the dropping port 6.

(5) The portion from the dropping port 6 and the L-valve 8 and the upper portion of the sintering furnace 3 (a portion below the distributor 2A of the granulating furnace) are connected to each other with a ventilation chute 7A while disposing a valve 7B at an intermediate position. Since the pressure of the portion below the distributor 2A is higher than that of a portion above the same and that of a portion adjacent to the dropping port 6, supply of hot air in an arbitrary quantity to a position above the L-valve 8 by the ventilation chute 7A and valve 7B enables hot air to be blown out at a flow velocity corresponding to the classification granule size (that is, the size of the granules intended to be blown back into the furnace) from the dropping port 6. That is, the ventilation chute 7A and the valve 7B serve as a so-called air supply means 7 for supplying air to the dropping port 6. If the grain size to be classified is set to be 2 mm for example, it is preferable that the flow velocity of the hot air to be blown out from the dropping port 6 be about 20 m/s.

As a result of employment of the foregoing structures (1) to (5), the sintering apparatus according to this embodiment is able to limit the granule size of the granules which pass through the dropping port 6 and the injection chute 9 to reach the sintering furnace 3 to substantially a predetermined size. The reason for this is that: in a case of the apparatus according to this embodiment, small granules cannot be introduced into the dropping port 6 due to the blowing effect realized by the hot air. On the other hand, granules having sizes larger than a predetermined size (although the predetermined size is arbitrarily determined depending upon the type and the purpose of the desired cement, it is set to be 2 mm for example) can easily be introduced into the dropping port 6 to reach the sintering furnace 3. By adjusting the degree of opening of the valve 7B of the ventilation means 7A and the gate 6A, the quantity of the hot air blown out from the dropping port 6 can be determined individually from the operation conditions set to the sintering furnace 3. Since a so-called previous classification using the nozzle 2C is performed prior to performing the classification using the dropping ports 6, the classifying accuracy is satisfactorily accurate and stable.

Figure 3:
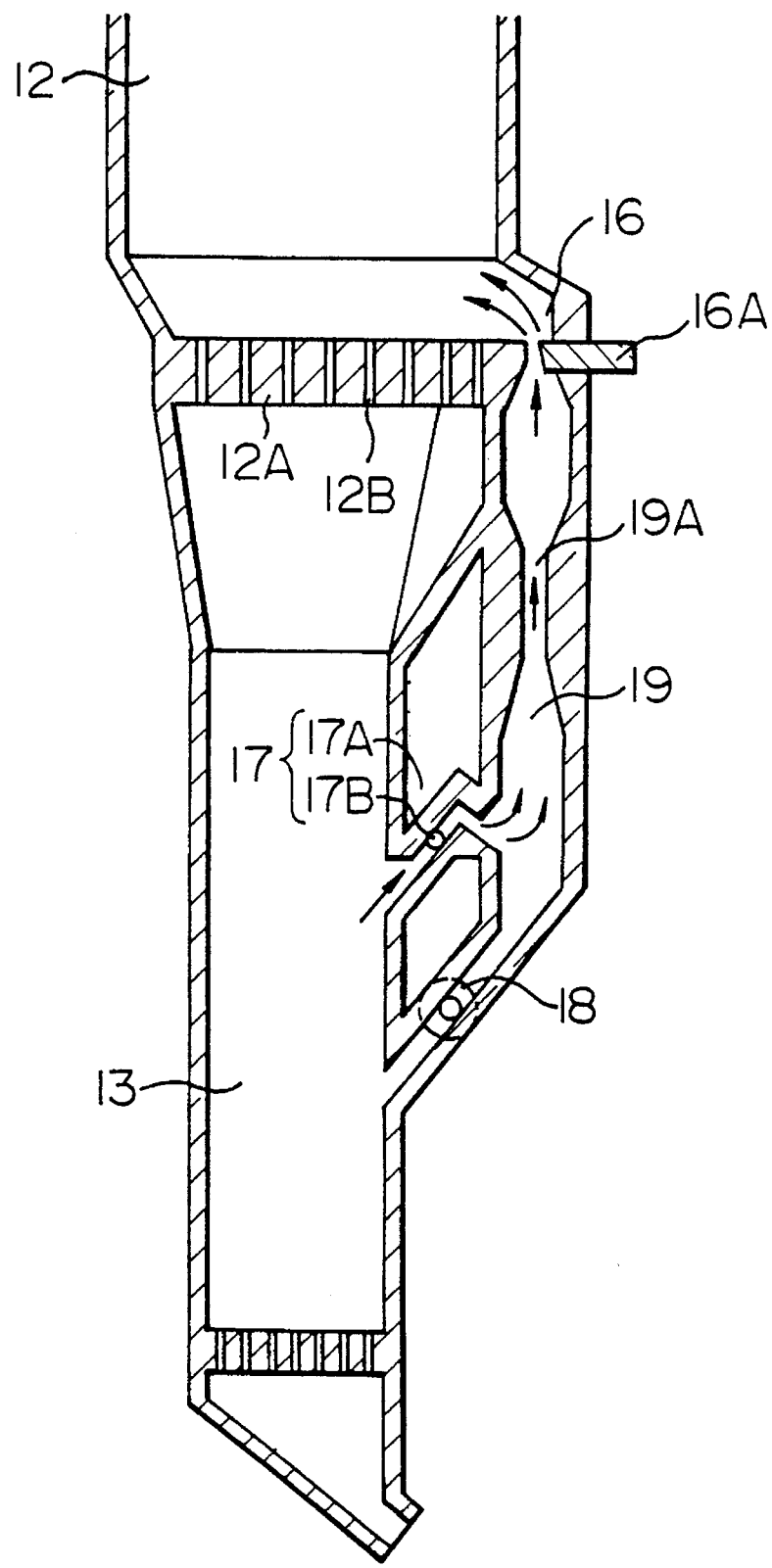
FIG. 3 is a vertical cross sectional view which illustrates an essential portion of an apparatus for sintering cement clinker according to a second embodiment of the first aspect of the present invention.

FIG. 3 illustrates an essential portion of an apparatus for sintering cement clinker according to a second embodiment of the first aspect of the present invention. Also this embodiment is arranged in such a manner that a sintering furnace 13 is integrally disposed below a distributor 12A of a granulating furnace 12. Granules granulated in the granulating furnace 12 are sent through the dropping ports 16 opened adjacent to the distributor 12A to pass through an injection chute 19 as to be injected into the sintering furnace 13. The granules to be injected into the sintering furnace 13, as described above, are classified at the dropping ports 16 and the injection chutes 19, that is, the size is limited to be lager than a predetermined size.

This embodiment is characterized in that a throttle portion 19A for throttling hot air is formed in a portion of the injection chute 19 arranged from the dropping ports 16 to an L-valve 18 (another hermetic discharge means, such as a rotary valve, may be used). Further, the lower portion of the throttle portion 19A and the upper portion of the sintering furnace 13 are connected to each other with a ventilation chute 17A having a valve 17B as to serve as a ventilation means 17 allowed to communicate with the throttle portion 19A and the dropping port 16. Individually from a portion allowed to pass through the nozzle 12B of the distributor 12A as to be introduced into the granulating furnace 12, a portion of hot air in the sintering furnace 13 is allowed to pass through the ventilation means 17 so that its flow rate is adjusted and then allowed to pass through the throttle portion 19A of the injection chute 19 and the dropping port 16 as to be blown into the (fluidized bed of the) granulating furnace 12. By adequately setting the cross sectional area of the opening of the dropping port 16 (having a gate 16A of a type capable of adjusting the degree of opening) and the throttle portion 19 (which may have a similar gate or the like) to be adaptable to the classified granule size, the granules are subjected to two classifying processes at the dropping port 16 and the throttle portion 19A. Therefore, an accurate result of classification can be obtained. As for the throttle portion 19A, it is preferable that the cross sectional area of the opening of the throttle portion 19A is made to be larger than that of the dropping port 16 to raise the flow velocity of the hot air while making the length to be twice the size of the opening.

Figure 4:
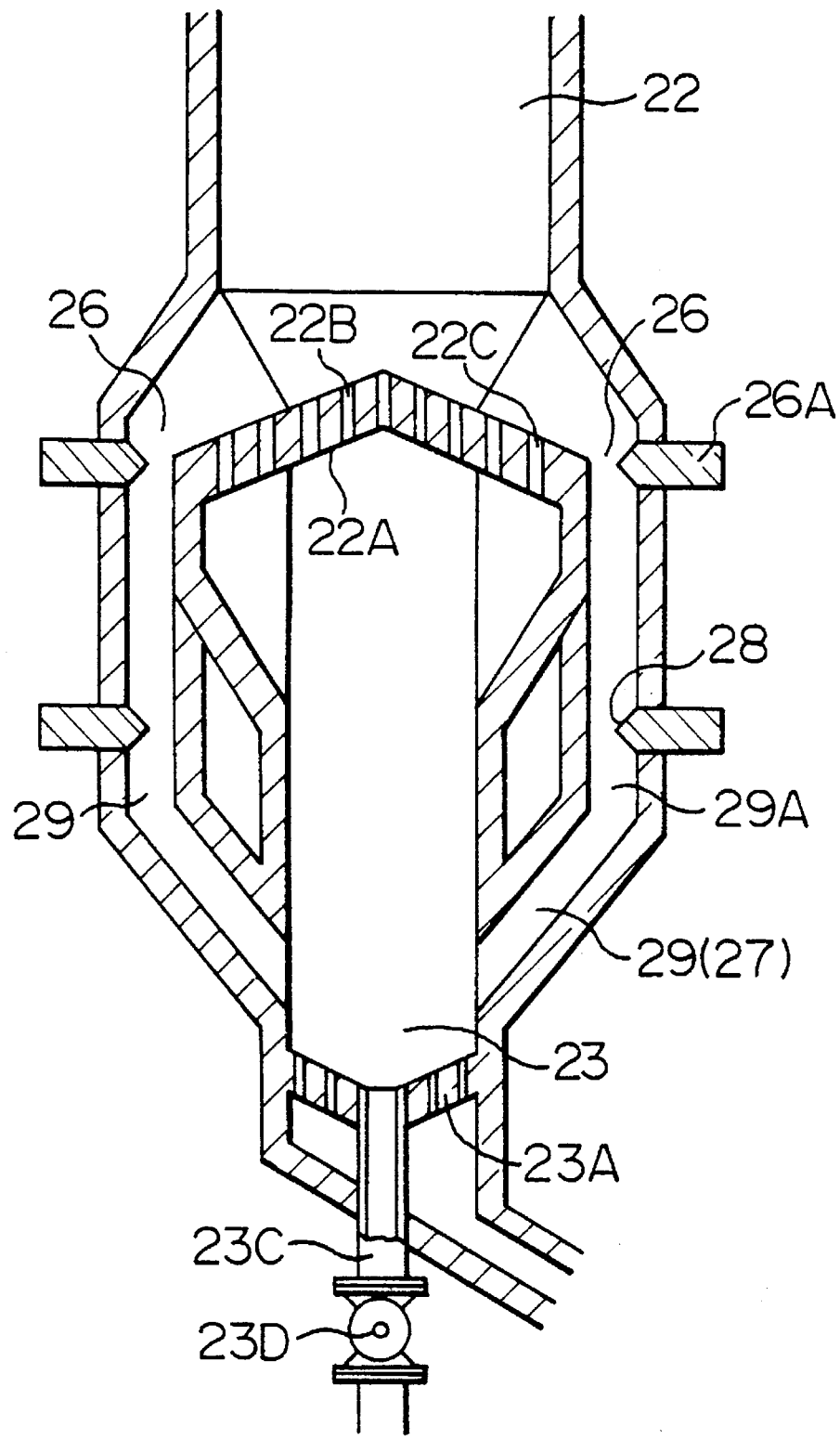
FIG. 4 is a vertical cross sectional view which illustrates an essential portion of an apparatus for sintering cement clinker according to a third embodiment of the first aspect of the present invention.

A third embodiment shown in FIG. 4 is arranged in such a manner that another gate 28 is disposed below a dropping port 26 having an opening/closing gate 26A at an intermediate position of an injection chute 29 arranged from a granulating furnace 22 to a sintering furnace 23. The gate 28 is made to be a portion of the foregoing throttle portion and also a portion of a hermetic discharge means for use in place of the L-valve. That is, a portion of the hot air from the sintering furnace 23 is usually allowed to pass through the injection chute 29 also serving as the ventilation means 27 so as to be blown out through the dropping port 26 at a predetermined flow velocity so that the effect of classifying the granules is exhibited. By narrowing the throttle portion 29A the degree of opening of which is adjusted by the gate 28, granules having granule sizes larger than a predetermined size are dropped through the dropping ports 16 as well as blown up at the throttle portion 29A so as to drift between the two gates. Therefore, repetition of a process composed of a first step of closing the gate 28 and a step of closing the gate 26A and as well as fully opening the gate 28 enables the granules to be discharged intermittently while maintaining air tightness.

This embodiment is arranged in such a manner that the distributor 22A is, as illustrated, formed into a pan shape as be inclined toward each dropping port 26. Further, a nozzle 22C having an opening larger than that of a usual nozzle 22B is formed adjacent to the dropping port 26 because of a similar object intended to be achieved as in the first embodiment (see FIGS. 1 and 2). It should be noted that the distributor 23A of the sintering furnace 23 is formed into a pan shape to have a lowered central portion to which a discharge chute 23C and a rotary valve 23D adapted to coarse granules are connected.

Figure 5A:
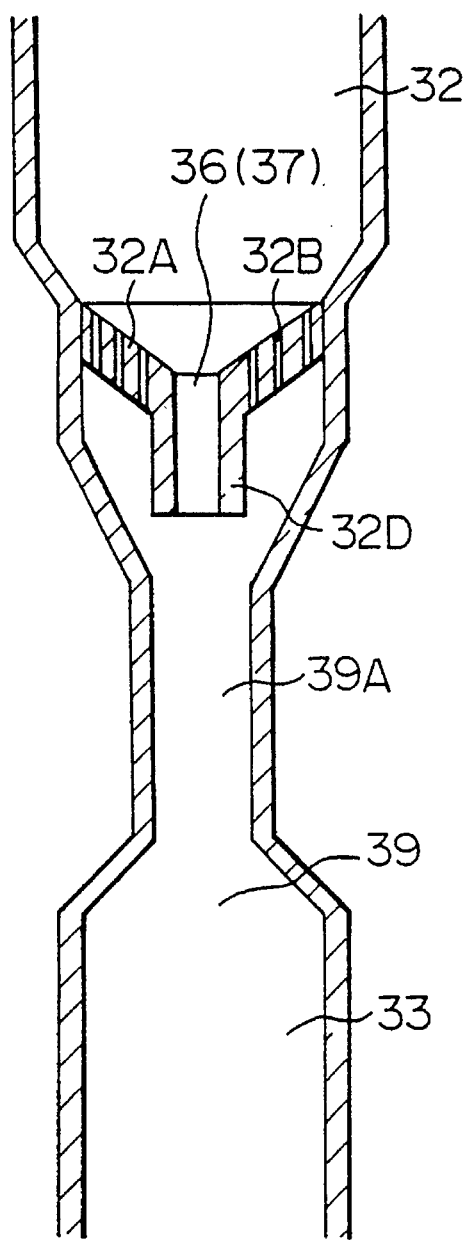
FIG. 5A is a vertical cross sectional view which illustrates an essential portion of an apparatus for sintering cement clinker according to a fourth embodiment of the first aspect of the present invention.
Figure 5B:
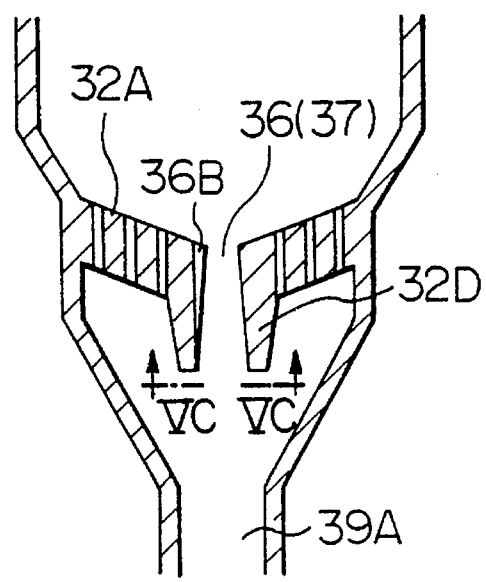
FIG. 5B is a vertical cross sectional view which illustrates partial modification of the apparatus shown in FIG. 5A.
Figure 5C:
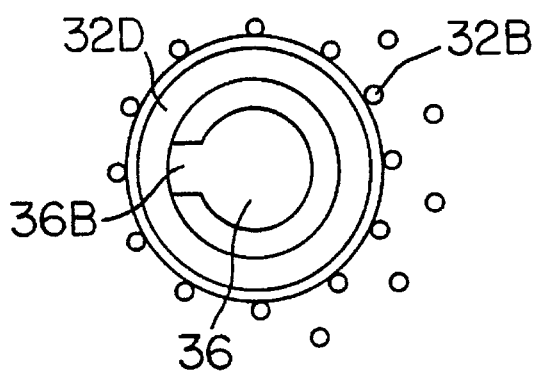
FIG. 5C is a cross sectional view taken along line C—C of FIG. 5B.

FIGS. 5A, 5B and 5C illustrate a fourth embodiment of the present invention in which a dropping port 36 for dropping granules from a granulating furnace 32 into a sintering furnace 33 is formed at the central portion of a distributor 32A of the granulating furnace 32. Further, a hot air throttle portion 39A is formed below the dropping port 36. FIG. 5A illustrates the simplest example of the foregoing structure, in which a chute 32D is extended from the lower portion of the center portion of the distributor 32A having a multiplicity of nozzles 32B and formed into a pan shape to make the inside portion of the chute 32D to be a dropping port 36 for granules also serving as a ventilation means 37. Hot air flowing from the sintering furnace 33 to the granulating furnace 32 is separably allowed to pass through the nozzles 32B and the foregoing dropping port 36. A portion of the hot air passing through the dropping port 36 (a so-called "boundary layer") that comes in contact with the internal surface of the dropping port 36 arises a flow of a flow velocity which is not substantially affected by the flow velocity of the other flows and which is substantially constant depending upon the roughness of the internal surface of the dropping port 36 and the coefficient of kinematic viscosity of the hot air. Therefore, in the apparatus shown in FIG. 5A, granules mainly composed of coarse components in the granulating furnace 32 are dropped through the portion around the dropping portion 36 at which the flow velocity is low. Since the portion of the granules that are dropped through the dropping port 36 cannot be classified sufficiently, the throttle portion 39A is formed so as to serve as a so-called second classifying portion. That is, granules, the granule sizes of which being relatively widely distributed, are dropped around the dropping port 36. Among the dropped granules, small granules are blown back with the hot air blowing up through the throttle portion 39A so as to be allowed to pass through the nozzle 32B and so forth before they are again introduced into the (spouted type fluidized bed of the) granulating furnace 32. As a result, granules larger than a predetermined granule size are injected into the sintering furnace 33 by way of an injection chute 39. Although the dropping port 36 is disposed on the central axis of the furnace, the arrangement that the injection chute 39 is not connected to the (chute 32D of the) distributor 32A and to the (furnace body of the) granulating furnace 32 disposed above the distributor 32A enables generation of thermal stress due to restriction to be reduced. As a result, no thermal problem arises due to the hot air sent from the sintering furnace 33.

If only granules having granules sizes larger than, for example, 2 mm are intended to be injected into the sintering furnace 33, it is preferable that the cross sectional area of each opening be determined to make the flow velocity of the hot air to be as follows: first, the nozzle 32B of the distributor 32A is set to a flow velocity of 50 to 60 m/s in order to prevent introduction of coarse granules. Although the flow velocity adjacent to the central portion of the dropping port 36 is therefore made to be 50 to 60 m/s, the boundary layer, the flow velocity at which is 10 m/s, is present adjacent to the internal surface of the dropping port 36 as described above. Further, the throttle portion 39A requires a flow velocity of about 20 m/s in order to blow back the granules having sizes of 2 mm or less.

FIGS. 5B and 5C illustrate a modification to this embodiment in which the dropping port 36 is tapered downwards and which comprises a partially formed cut groove 36B. Since the dropping port 36 opens downwards, a low velocity boundary layer can easily be formed on the internal surface. Also the groove 36B enables a similar effect to be obtained. Therefore, this modification is characterized in that granules can be stably dropped (and blown back at the throttle portion 39A in a manner similar to the foregoing embodiments).

FIGS. 6A and 6B illustrate a fifth embodiment which is an arrangement of the embodiments shown in FIGS. 5A, 5B and 5C, made in such a manner that the flow velocity of hot air flowing in the dropping port 36 can be adjusted. This embodiment is, similar the fourth embodiment, arranged such that a chute 42D is disposed in a distributor 42A having nozzles 42B and formed into a pan shape so that the inner portion of the chute 42D is made to be a dropping port 46 (also serving a ventilation means 47). Further, a valve 46A formed as illustrated is disposed to face the lower opening of the chute 42D. The valve 46A has a rod 46B extending horizontally to project over the outer wall of the granulating furnace 42. By operating the rod 46B to vertically shift the position of the valve 46A, the area of the opening formed in the lower portion of the dropping port 46 can be adjusted. The change of the foregoing area enables the quantity of granules to be dropped through the dropping port 46 to be adjusted. In addition, time in which the granules are allowed to reside in the granulating furnace 42 can be controlled. However, granules smaller than a predetermined size among the granules which are dropped through the dropping port 46 are blown back with hot air blowing up through a throttle portion 49A positioned below the dropping port 46 so as to be allowed to pass through the nozzles 42B before they are again introduced into the fluidized bed in the granulating furnace 42. It should be noted that the valve 46A formed into the cup shape facing upwards also exhibits an effect of dispersing granules formed into blocks when they collides with it.

It is preferable that the diameters and lengths of the dropping port 46 and the throttle portion 49A be determined depending upon the following fact. First, the diameter D of the throttle portion 49A is so determined that the flow velocity of hot air corresponds to the granule size of granules that is intended to be classified (that is, intended to be blown back). The diameter of d of the dropping port 46 is determined in such a manner that d/D is 0.2 to 0.3. If d/D is 0.2 or more, granules can easily be dropped from the portion around the dropping port 46 even if the flow velocity in the portion around the central portion of the dropping port 46 is substantially the same as that in the nozzle 42B. The lengths l and L of the dropping port 46 and the throttle portion 49A, respectively are determined to satisfy $l=\alpha \times d$ and $L=\beta \times D$ and both of $\alpha$ and $\beta$ are 0.5 to 2. If l and L are too short, small granules having sizes smaller than the classified size are allowed to undesirably pass through the dropping port 46 and the throttle portion 49A. If the lengths are determined to be the foregoing values, the small granules are blown back upwards so that classification can effectively be performed.

Although the foregoing embodiments are arranged as described above, the present invention may be embodied as follows, for example:

(a) The dropping port may be formed above the fluidized bed in place of the level of the top surface of the distributor of the fluidized bed granulating furnace to cause the fluidized granules to overflow so as to be introduced into the dropping port. That is, the embodiments shown in FIGS. 1A and 1B (or FIG. 3) are arranged in such a manner that the opening serving as the dropping port 6 is formed in the side wall of the granulating furnace 2 above the distributor 2A. The embodiments shown in FIGS. 5A, 5B, 5C and FIGS. 6A and 6B are arranged in such a manner that the chute 32D is allowed to extend to a position above the distributor 32A for example to be opened in the fluidized bed. Further, a ventilation means is provided for the thus-arranged dropping port to classify the granules.

(b) The classifying gas (the hot air) to be sent to the dropping port may be introduced from another apparatus, for example, the cooling units 4 or 5 shown in FIG. 2 in place of the sintering furnace. In this case, the fact that the temperature of the gas is somewhat low enables an advantage to be realized in that the mutual melting adhesion (agglomeration) of granules can be prevented.

(c) The cross sectional shape of the opening of each of the nozzles, the dropping ports, the injection chutes and the throttle portions of the outer wall and the distributor of the granulating furnace and the sintering furnace is not limited to the circular shape. For example, the cross sectional shape may, of course, be formed into a square or another polygonal shape.

The method and the apparatus for sintering cement clinker according to the present invention comprise the spouted-type fluidized bed granulating furnace and the fluidized bed sintering so as to be able to preferably granulate and sinter the material. Further, the granule size of the granules to be injected from the former furnace to the latter furnace can accurately be graded. Therefore, high quality cement clinker can smoothly be sintered. In addition, the granules are not allowed to grow to have excessively large sizes in the granulating furnace. As a result, advantages can be realized in that an excellent granulating efficiency results and generation of agglomeration in the granulating furnace and the sintering furnace cannot easily be generated and therefore the fluidized bed in each furnace can be stabilized and the operation of the apparatus can easily be performed.

Since the sintering apparatus having the throttle portion is able to classify granules twice, the granules can be classified further accurately.

An apparatus for discharging granules from a spouted-type fluidized bed granulating furnace (hereinafter called a "particle discharge apparatus") according to a second aspect of the present invention will now be described in detail with reference to the drawings.

Figure 7:
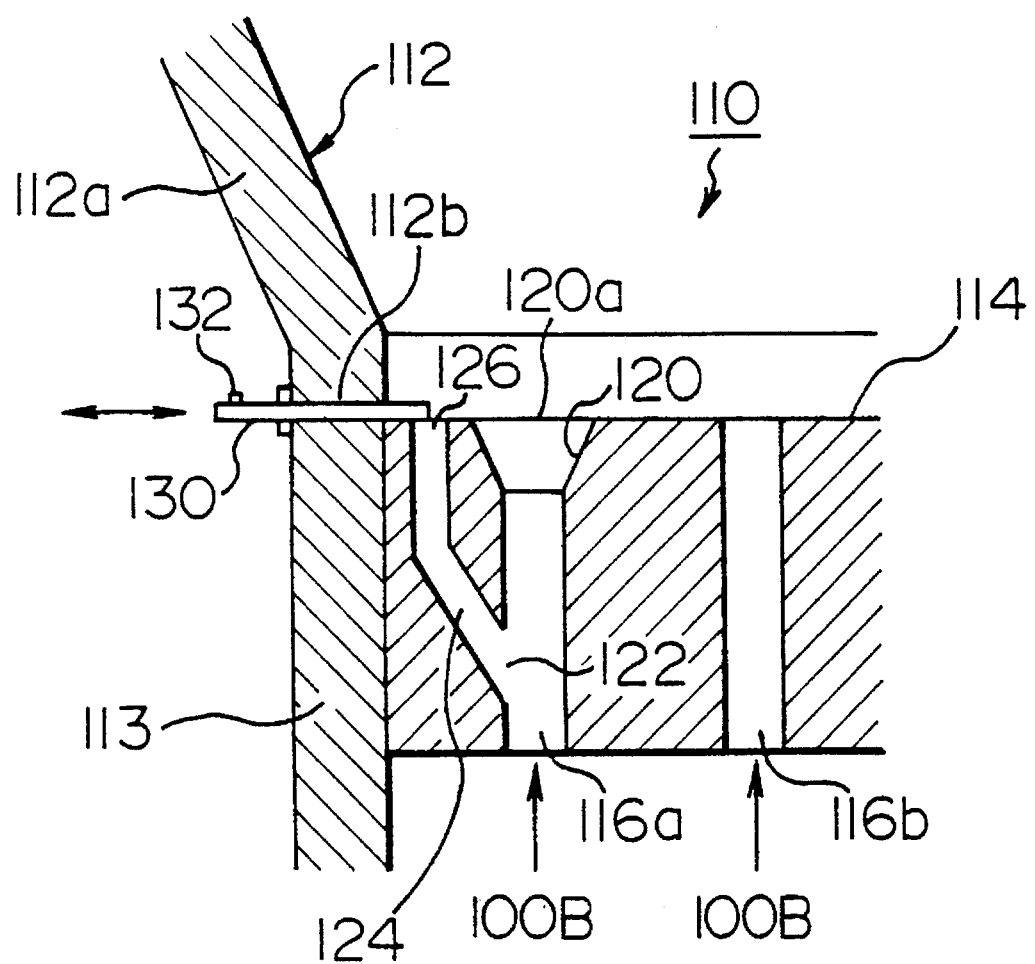
FIG. 7 is a partially enlarged cross sectional view which illustrates a particle discharge apparatus according to a second aspect of the present invention.
Figure 8:
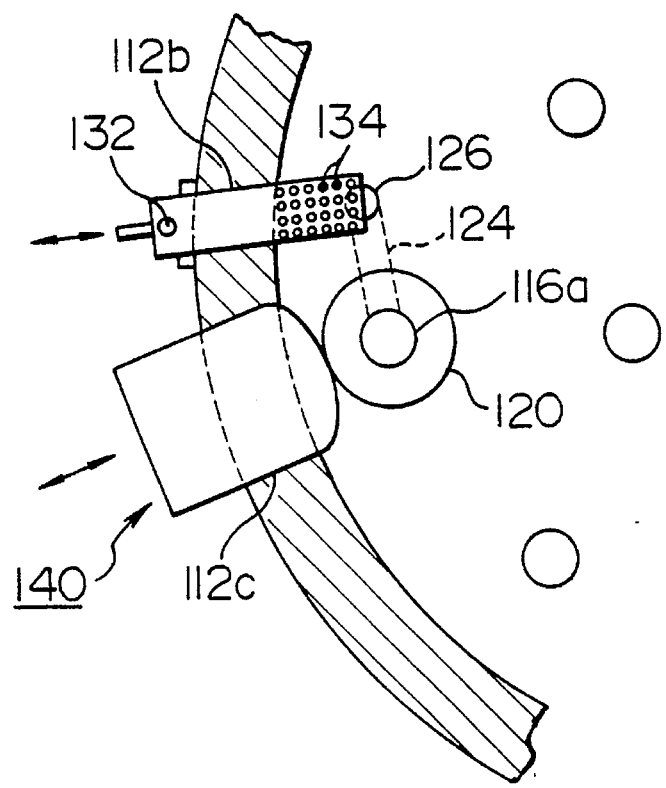
FIG. 8 is a partial top view of the particle discharge apparatus shown in FIG. 7.

FIG. 7 is a partially enlarged cross sectional view which illustrates the particle discharge apparatus according to the second aspect of the present invention. FIG. 8 is a partial top view which illustrates the particle discharge apparatus shown in FIG. 7. Referring to the drawings, reference numeral 110 represents the particle discharge apparatus according to the second aspect of the present invention. The particle discharge apparatus 110 utilizes, for example, the perforated distributor 114 disposed in the bottom throat portion 113 of the fluidized bed furnace 112 such as the spouted-type fluidized bed granulating furnace and the fluidized bed sintering furnace for manufacturing cement clinker.

That is, the distributor 114 has a multiplicity of nozzle holes 116a and 116b. The top portion of at least one of the nozzle holes 116a is formed into an inverse truncated cone shape so that an inverse truncated cone portion, that is, a cone portion 120 is formed. An opening 122 is formed in the side wall of the nozzle hole at a position below the cone portion 120 of the nozzle hole 116a. In addition, a bypass passage 124 is formed from the opening 122 to the top end of the distributor 114.

Figure 9:
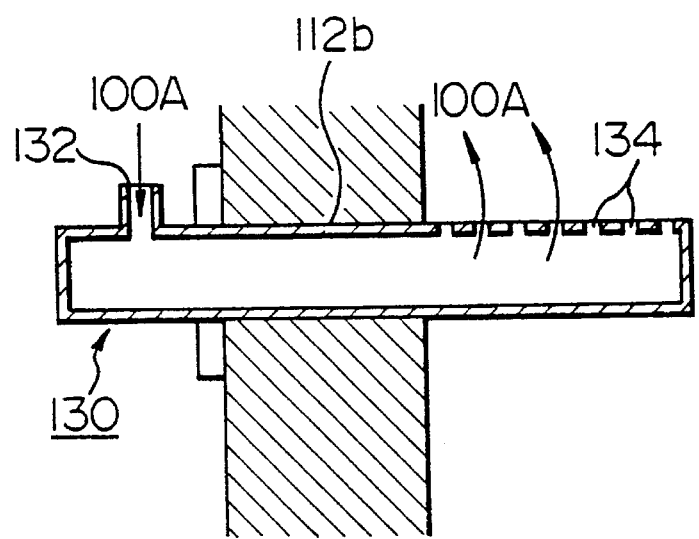
FIG. 9 is an enlarged cross sectional view which illustrates the structure of a gate member 30 of the particle discharge apparatus according to the second aspect of the present invention.

Further, a gate member 130 is disposed which slidably penetrates an opening portion 112b formed in a side wall 112a of the fluidized bed furnace 112 at the top end of the distributor 114 of the fluidized bed furnace 112 and which is able to open/close a top end opening 126 formed in the distributor 114 of the bypass passage 124. The mechanism for opening/closing the gate member 130 may be a known piston cylinder mechanism without any particular limitation. The gate member 130 is, as illustrated in an enlarged cross sectional view shown in FIG. 9, formed into a hollow shape so as to enable air 100A blown in from an air source (omitted from illustration) connected byway of an air introduction port 132 to be jetted out through a plurality of air jetting out ports 134 formed in the top surface of the gate member 130. As a result, granules deposited on the top surface of the gate member 130 can always be fluidized when the gate is closed. Therefore, the gate member 130 can be smoothly opened/ closed while preventing a risk that the gate member is burnt.

Further, a gate member 140 is disposed which slidably penetrates an opening portion 112c formed in the side wall 112a of the fluidized bed furnace 112 at the top end of the distributor 114 of the fluidized bed furnace 112 and which is able to open/close a top end opening 120a formed at the top end of the cone portion 120 of the nozzle hole 116a. Also the mechanism for opening/closing the gate member 140 may be a known piston cylinder mechanism without any particular limitation. The gate member 140 may, of course, have the air jetting out holes formed in the top surface thereof similar to the gate member 130 so as to enable the gate member 140 to be slidably opened/closed.

The size of the cone portion 120, the position at which the bypass passage 124 is formed, the lengths and the hole diameters of the nozzle hole 116a and the bypass passage 124 may, of course arbitrarily, be determined to be adaptable to the flow velocity of the spouted gas, type and the granule size of the granules to be classified and discharged while being free from any particular limitation.

Although this embodiment is arranged in such a manner that the cone portion 120 is formed by opening the top end of the nozzle hole 116a into an inverse conical shape, forming of the cone portion may be omitted while adjusting only the degree of opening of the bypass passage 124 to adjust the flow velocity of the spouted gas passing through the nozzle hole 116a so as to classify and discharge granules.

The operation of the foregoing particle discharge apparatus will now be described.

First, the formation of a small fluidized bed by the cone portion 120 formed at the top end of the nozzle hole 116a of the distributor 114 somewhat decreases the flow velocity of the spouted gas 100B passing through the nozzle hole 116a from a position below the distributor 114. By adjusting the gate member 130 so as to enlarge the degree of opening of the top end opening 126 of the distributor 114 of the bypass passage 124, the flow velocity of the spouted gas passing through the nozzle hole 116a at a position above the opening 122 of the bypass passage 124 for the nozzle hole 116a is further decreased. Therefore, the granules in the fluidized bed furnace 112 having particle sizes corresponding to the foregoing flow velocity, are dropped against the flow velocity so that they are continuously and stably classified and discharged.

By adjusting the gate member 130 to adjust the degree of opening of the top end opening of the distributor 114 of the bypass passage 124 in the foregoing case, the flow velocity of the spouted gas passing through the nozzle hole 116a can be adjusted. As a result, the particle size of the granules which are dropped from the fluidized bed furnace 112 can arbitrarily be changed, enabling the classification to be performed.

If the flow velocity of the spouted gas passing through the nozzle hole 116a is abnormally decreased and therefore the dropping of the granules from the fluidized bed furnace 112 cannot be prevented, the top end opening 120a of the cone portion 120 of the nozzle hole 116a is closed by the gate member 140 so as to stop the dropping. When the gate member 140 is then opened, the granules can be classified and discharged.

Figure 16:
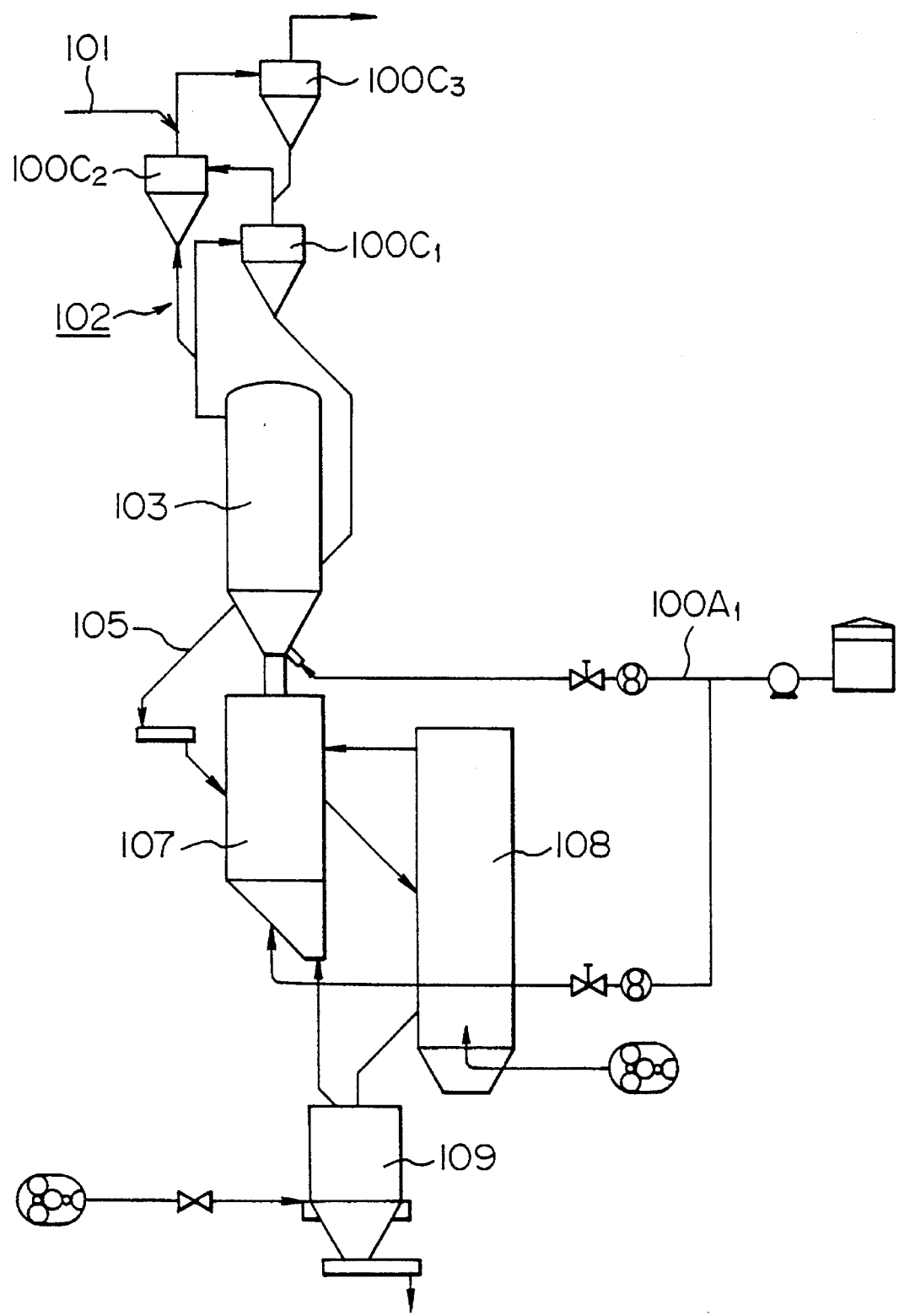
FIG. 16 is a view which schematically explains the overall structure of the apparatus for sintering cement clinker.

The particle discharge apparatus according to the second aspect of the present invention can be adapted to, for example, the fluidized bed granulating furnace 103 and the fluidized bed sintering furnace 107 for manufacturing cement clinker as shown in FIG. 16. Further, it can, of course, be adapted to usual fluidized bed furnaces.

The foregoing particle discharge apparatus according to the second aspect of the present invention comprises the cone portion formed at the top end of the nozzle hole of the distributor to form a small fluidized bed so as to somewhat decrease the flow velocity of the spouted gas passing through the nozzle hole. Further, the degree of opening of the top end opening of the distributor in the bypass passage is adjusted by the gate means so as to enable the flow velocity of the spouted gas passing through the nozzle hole to be controlled. As a result, the granules in the fluidized bed furnace having the particle sizes corresponding to the flow velocity are dropped through the nozzle hole against the flow velocity so that classification and discharge of the granules are enabled. Therefore, the following effects can be obtained:

(1) The granules having desired particle sizes can be selectively discharged.

(2) Since the granules can be continuously and stably discharged, the ensuing operation of the sintering furnace for example can be stabilized. Therefore, the quality can be improved.

(3) Since the granules do not reside in the nozzle hole, adhesion and blockage can be prevented.

(4) The heat loss experienced with the conventional discharging structure comprising an external discharge chute can be prevented. Further, at least one of the nozzle holes of the distributor can be used as the discharge port, resulting in that the structure can be simplified.

(5) Even if abnormal dropping of granules takes place, the gate means is able to easily restore and recover the cone portion in the upper portion of the nozzle hole.

Thus, the present invention enables significant advantages and effects to be obtained.

An apparatus for sintering cement clinker according to a third aspect of the present invention will now be described with reference to the drawings.

Figure 17:
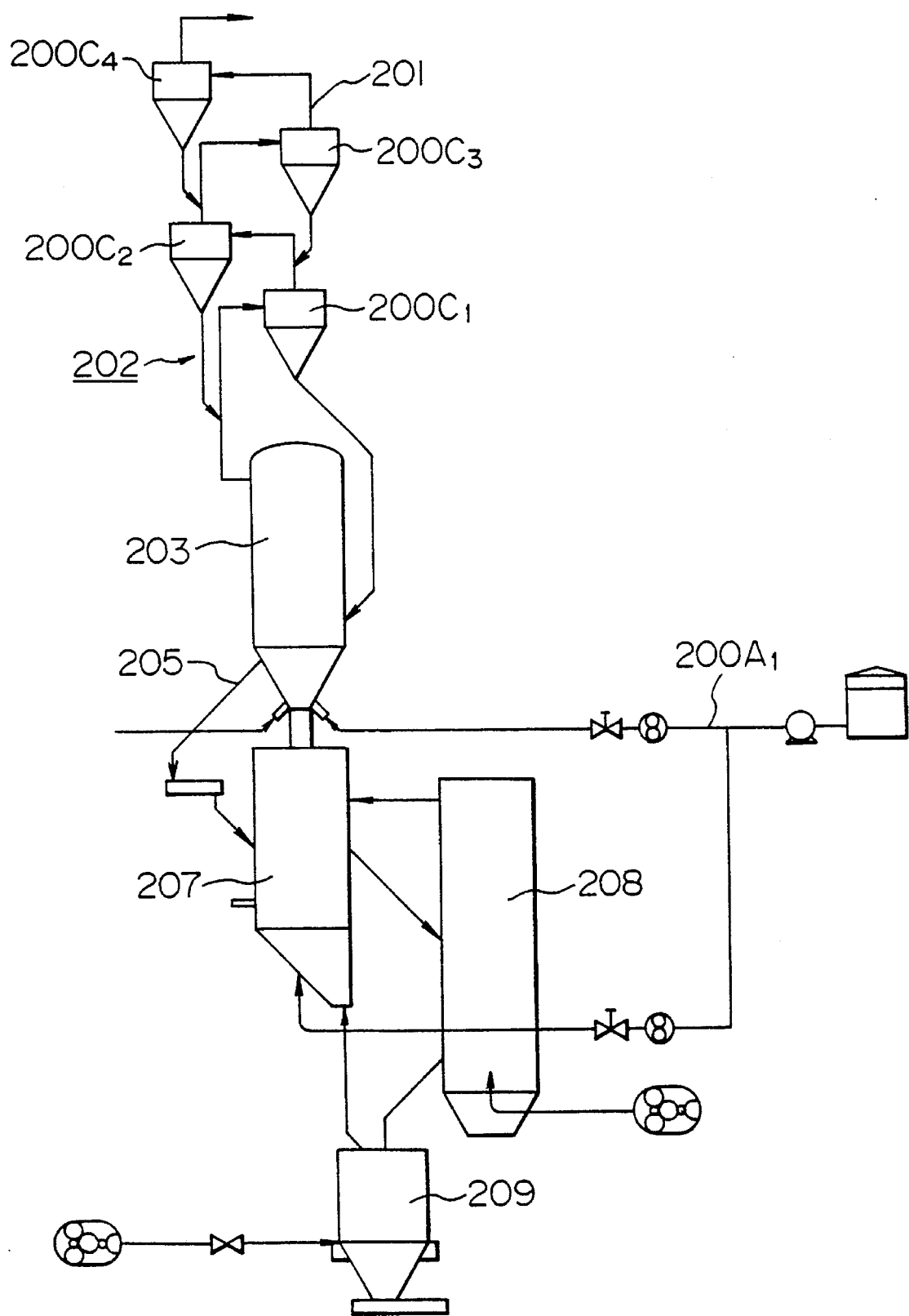
FIG. 17 is a view which schematically explains the structure of the conventional apparatus for sintering cement clinker.
Figure 18:
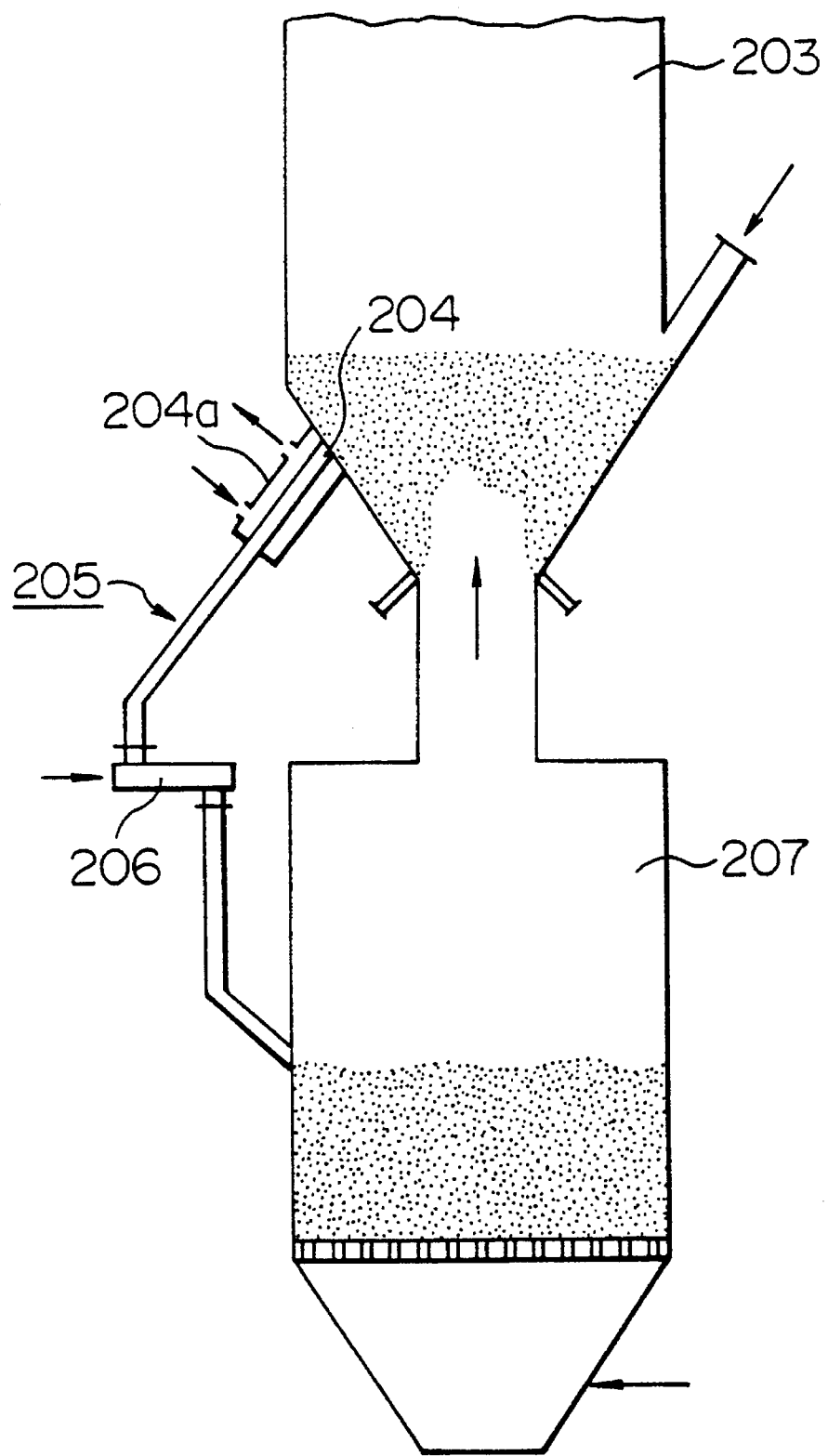
FIG. 18 is a partially enlarged cross sectional view which illustrates the conventional apparatus for sintering cement clinker.
Figure 19:
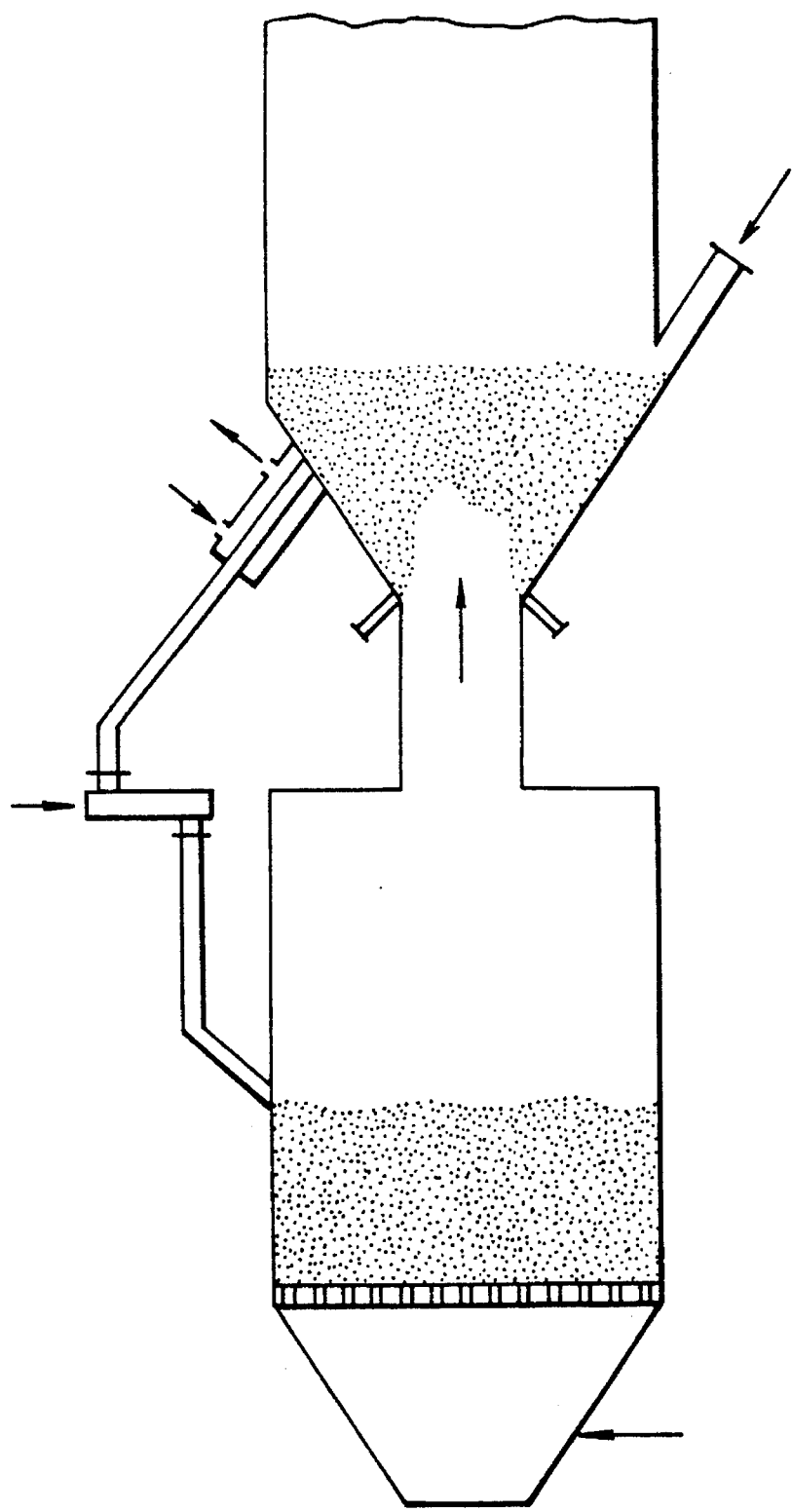
FIG. 19 is a schematic view which illustrates the conventional apparatus for sintering cement clinker

The apparatus for sintering cement clinker according to the third aspect of the present invention is constituted similarly to the conventional structure shown in FIG. 17. That is, the conventional apparatus is, as described above, arranged in such a manner that raw material powder for cement injected through the raw material injection chute 201 is previously heated by the suspension pre-heater 202 comprising the cyclones $200C_1$ to $200C_4$ when the raw material powder is allowed to pass through the cyclones $200C_1$ to $200C_4$. The previously-heated raw material powder for cement is injected into the granulating furnace 203 of the fluidized bed type or the spouted bed type. Then, the granules are fluidized or spouted and granulated in the granulating furnace 203 are injected into the fluidized bed sintering furnace 207 disposed below the granulating furnace 203. The third aspect of the present invention is intended to improve the injection passage.

More specifically, the apparatus for sintering cement clinker according to the third aspect of the present invention will now be described with reference to FIG. 10 which is a partially enlarged cross sectional view.

Figure 10:
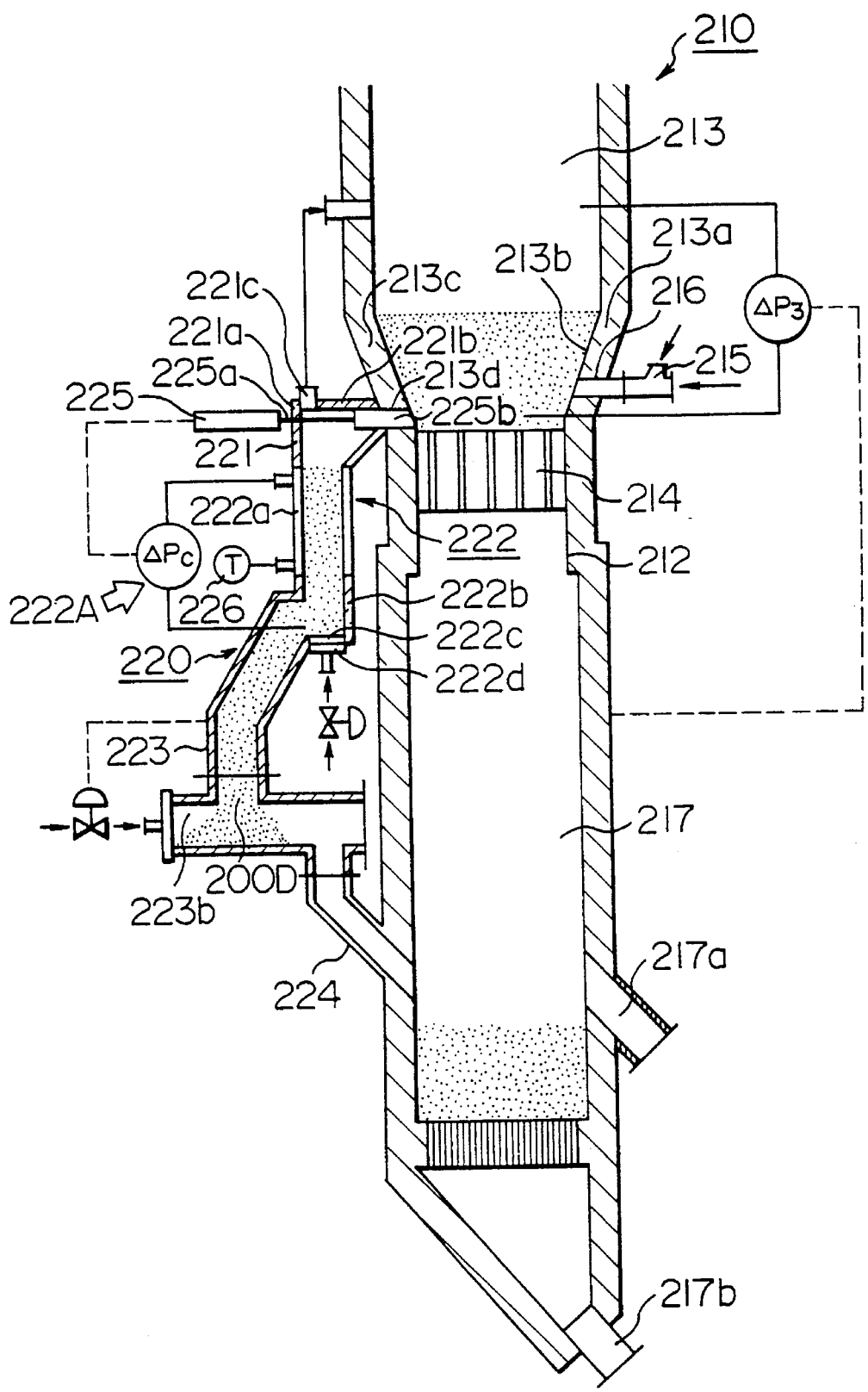
FIG. 10 is a partially enlarged cross sectional view which illustrates an apparatus for sintering cement clinker according to the third aspect of the present invention.

Referring to FIG. 10, reference numeral 210 represents an apparatus for sintering cement clinker, the apparatus 210 for sintering cement clinker comprising a granulating furnace 213, a fluidized bed sintering furnace 217 connected to the lower portion of the granulating furnace 213 while interposing a throat portion 212 and a perforated distributor 214 disposed above it, and a discharge passage 220 formed from the side wall adjacent to the bottom portion of the granulating furnace 213 to the fluidized bed sintering furnace 217.

The lower portion of the granulating furnace 213 is formed into an inversely truncated cone portion 213a having a side wall 213b including a raw material supply port 216. Therefore, the raw material previously heated by the suspension pre-heater is, in an extruding blower (omitted from illustration), supplied through the supply port 216 by way of the ejector 215 so that the raw material is, together with fuel injected into the lower portion of the fluidizing furnace by way of a fuel supply line, form a spouted bed or a fluidized bed so as to be spontaneously granulated. It should be noted that the fluidized bed sintering furnace 217 has an opening portion 217a allowed to communicate with a fluidized bed cooler and an opening portion 217b allowed to communicate with a moving bed cooler.

On the other hand, the granulating furnace 213 has a bottom flow discharge port 213d formed in a side wall 213c adjacent to the bottom portion of the inversely truncated cone portion 213a in the lower portion thereof. The discharge passage 220 is connected to the bottom flow discharge port 213d.

The discharge passage 220 comprises an upper discharge chute portion 221 connected to the bottom flow discharge port 213d, a fluidized cooling chute portion 222 downwardly disposed in the vertical direction from the upper discharge chute portion 221, a L-valve (a hermetic discharge apparatus) portion 223 connected to the fluidized cooling chute portion 222 and having a substantially L-shape cross section, and a lower discharge portion 224 connected to the portion below the L-valve portion 223 and extending to the fluidized bed sintering furnace 217.

The upper discharge chute portion 221 has a plug mechanism comprising a rod 225a of a known cylinder mechanism 225 disposed on the outside of a side wall 221a of the upper discharge chute portion 221, the rod 225a penetrating the side wall 221a and having a plug 225b at the leading portion thereof. The plug 225b is projected when the cylinder mechanism 225 is operated, and therefore the bottom flow discharge port 213d formed in the granulating furnace 213 can be opened/closed. A gas discharge port 221c is formed in an upper wall 221b of the upper discharge chute portion 221 so that hot air is introduced into the granulating furnace 213, the temperature of the hot air being raised due to heat exchange performed by the granules with cooling air blown into the fluidized cooling chute portion 222 by way of a distributor 222d to be described later.

The fluidized cooling chute portion 222 has a so-called cooling jacket 222a formed in the upper portion of the fluidized cooling chute portion 222 in order to prevent blockage of the discharge chute, the cooling jacket 222a allowing a cooling medium such as air or water to circulate therein. As a result, the discharge granules are indirectly cooled so that adhesion of the granules to the inner wall is prevented. Further, a projection portion 222c projecting outwards is formed at the lower end of the side wall 222b at the lower end of the fluidized cooling chute portion 222 adjacent to the furnace. The projection portion 222c has a perforated distributor 222d. Cooling air is blown upwards into the fluidized cooling chute portion 222 so that a so-called fluidized bed is formed, causing the granules to be fluidized and cooled. As a result of the arrangement of the foregoing cooling jacket 222a and the fluidized bed, a so-called small size fluidized bed cooling structure 222A is formed. It should be noted that reference numeral 226 represents a temperature detection unit, such as a thermo couple.

The L-valve (the hermetic discharge apparatus) portion 223 is formed into a known structure with which the granules allowed to reside in a lower residing chamber 223b are discharged into the lower discharge chute portion 224 with air blown from the side portion of the residing chamber 223b.

The operation of the foregoing apparatus for sintering cement clinker according to the third aspect of the present invention will now be described.

When the plug 225b blocking the bottom flow discharge port 213d is operated by the cylinder mechanism 225, the granules spontaneously granulated in the granulating furnace 213 are discharged into the discharge passage 220. As a result, the portion from the upper discharge chute portion 221 to the residing chamber 223b formed below the L-valve (the hermetic discharge apparatus) portion 223 is filled with the granules, causing material seal to be realized (as represented with reference numeral 200D shown in FIG. 10).

When the granules have been discharged into the discharge passage 220 to a predetermined level of the upper discharge chute portion 221, the cylinder mechanism 225 is operated in order to block the bottom flow discharge port 213d with the plug 225b so that the discharge of the granules is stopped.

In this case, the temperature of the granules discharged into the discharge passage 220 is about 1300° C. and the granules exhibit a great adhesion. The cooling effect realized by the cooling jacket 222a and the effect of a so-called small size fluidized bed cooling structure 222A of the fluidized bed formed by cooling air blown in by way of the distributor 222d cause the granules to be fluidized and cooled. As a result, the granules can be cooled to 1200° C. or lower at which temperature the granules lose their adhesion.

The thus-cooled granules allowed to reside in the residing chamber 223b of the L-valve 223 are continuously discharged into the lower discharge chute portion 224a with air blown from the side portion of the residing chamber 223b to be injected into the fluidized bed sintering furnace 217 as to be sintered. The foregoing cycle is repeated.

When the foregoing cycle is repeated, the following adjustment is performed.

That is, the bed differential pressure $\Delta P_B$ of the granulating furnace 213 is, as shown in FIG. 10, made to be a value corresponding to a predetermined residing time by controlling the quantity of discharge from the L-valve 223. In this case, the quantity of the discharge can be changed by controlling the pressure, air quantity and blowing intervals of compressed air to be blown out intermittently from the rear end of the L-valve 223. If the excess discharge quantity from the granulating furnace 213 has lowered the bed differential pressure $\Delta P_B$, mixture takes place between the small size fluidized bed cooling structure 222A and the granulating furnace 213, and therefore the temperature of the small size fluidized bed cooling structure 222A cannot easily be maintained with cooling air blown by way of the distributor 222d.

In order to make the bed differential pressure $\Delta P_C$ of the small size fluidized bed cooling structure 222A to be included in a predetermined range, the degree of opening and closing of the plug 225b is adjusted. As a result, the temperature of the small size fluidized bed cooling structure 222A can be maintained at a level at which the adhesion of the granules can be prevented and allow control of the bed differential pressure of the granulating furnace 213. Further, a packed bed between the small size fluidized bed cooling structure 222A and the L-valve 223 can be maintained, and accordingly air tightness can be maintained.

Further, the temperature T of the small size fluidized bed cooling structure 222A is made to be a level (1200° C. or lower) at which the adhesion can be prevented by adjusting cooling air blown by way of the distributor 222d.

The apparatus for sintering cement clinker according to the third aspect of the present invention comprises a so-called bottom flow discharge structure arranged in such a manner that granules are taken out through the bottom flow discharge port formed in the side wall adjacent to the bottom of the conventional granulating furnace, and the granules are injected into the sintering furnace by way of the discharge chute and the hermetic discharge apparatus connected to the discharge port, wherein the plug mechanism enables the bottom flow discharge port to be opened/closed and the discharge chute is formed into the small size fluidized bed cooling structure 222A having the fluidized cooling means for fluidizing and cooling the granules. Therefore, the following effects can be obtained.

(1) The granules discharged through the bottom flow discharge port are uniformly cooled to the temperature (1200° C. or lower) at which generation of a liquid phase is prevented in the discharge chute. Therefore, mutual adhesion of the granules and blockage of the discharge chute due to adhesion of the granules to the wall surface of the discharge chute can be prevented. As a result, the granules can be smoothly supplied to the sintering furnace, causing the operation to be stabilized.

(2) Since the bottom flow discharge port can be opened/closed due to the employment of the plug mechanism, the level of the granules to be discharged into the discharge passage can be adjusted. Further, back flow of the granules can be prevented and the bed differential pressure (the residing time) in the granulating furnace can be controlled.

(3) Since excessively large granules and large blocks generated due to separation of coating can be discharged, cessation of the operation due to abnormal fluidization can be prevented.

As described above, excellent effects can be obtained.

Embodiments of a fourth aspect of the present invention will now be described with reference to the drawings.

Figure 11:
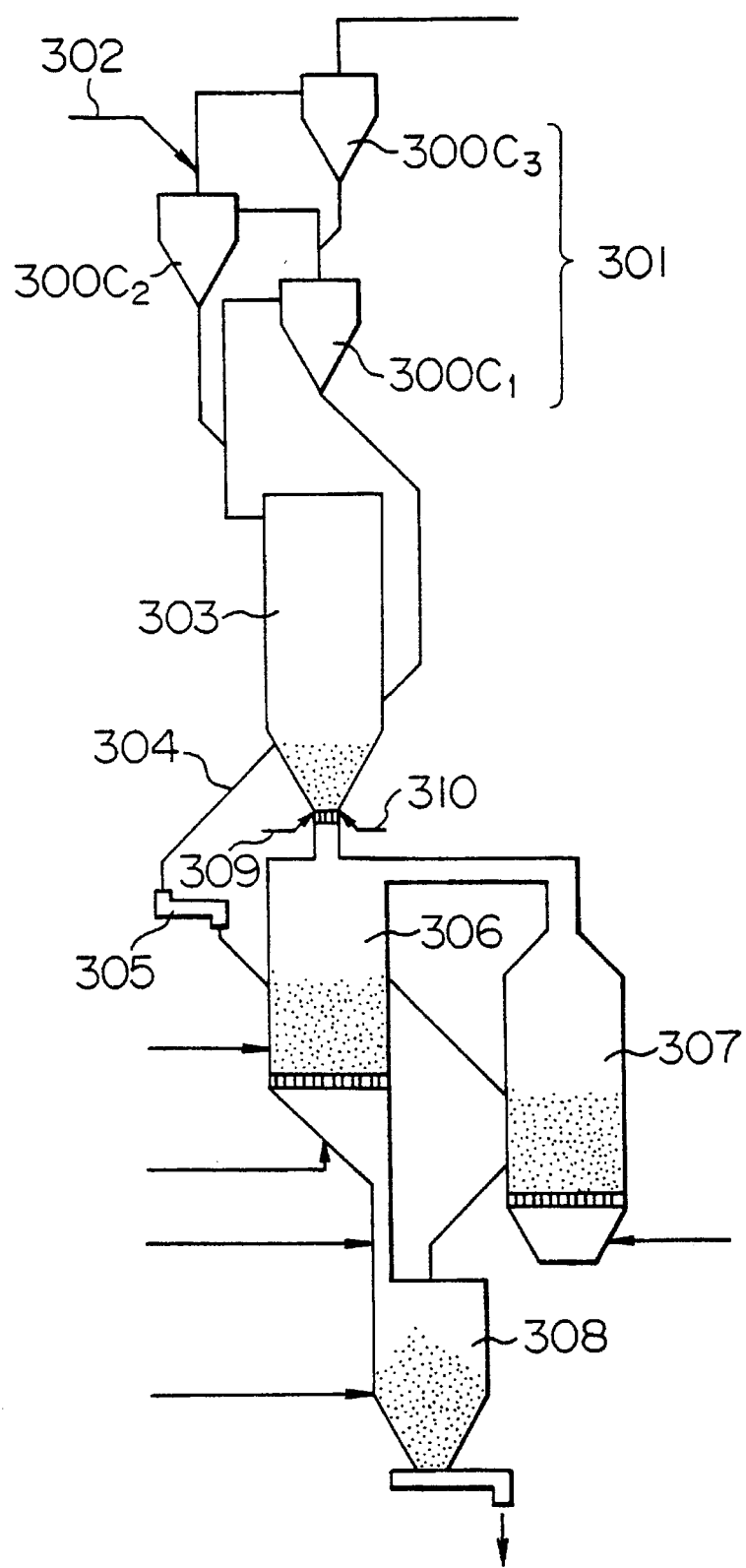
FIG. 11 is a schematic view which illustrates a fluidized bed cement sintering equipment.
Figure 12:
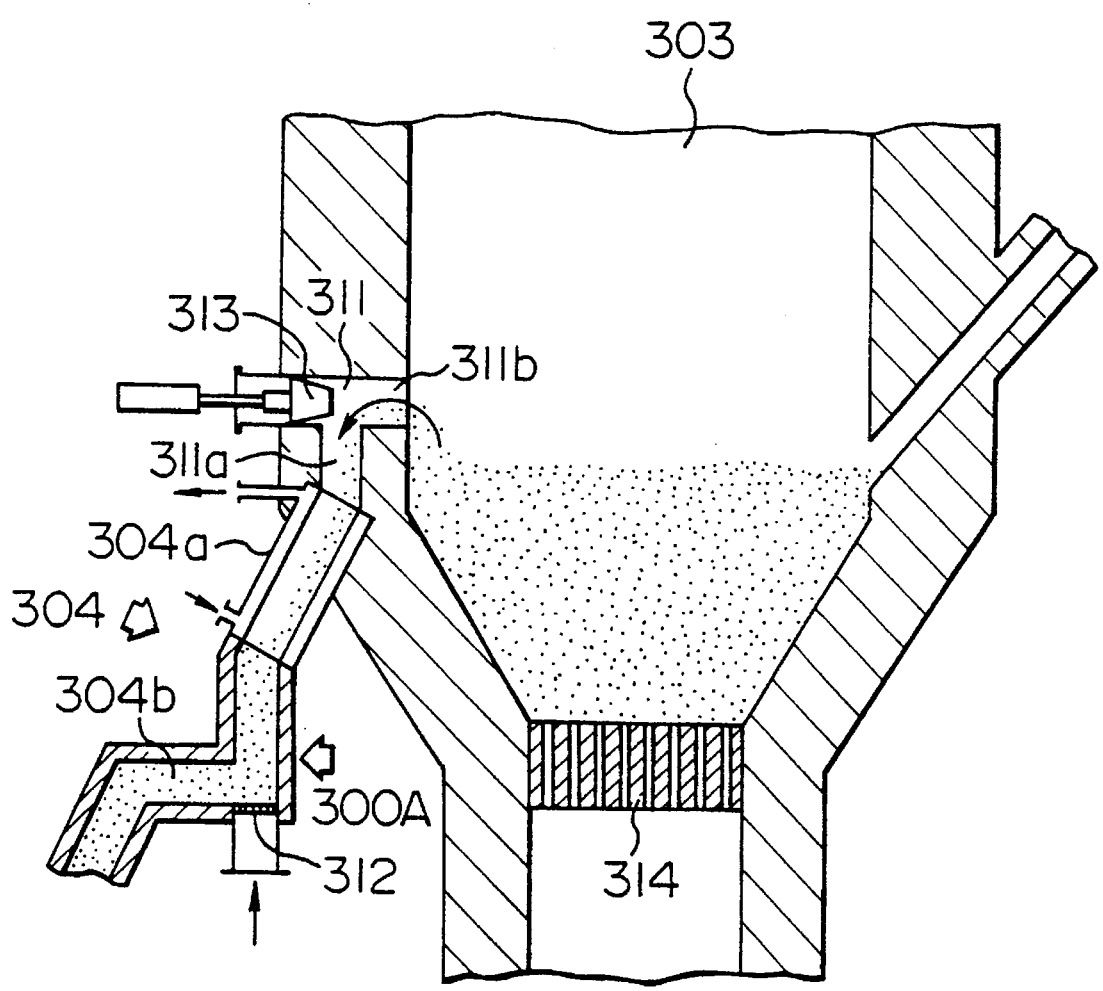
FIG. 12 is a cross sectional view which illustrates an essential portion of the same.
Figure 13:
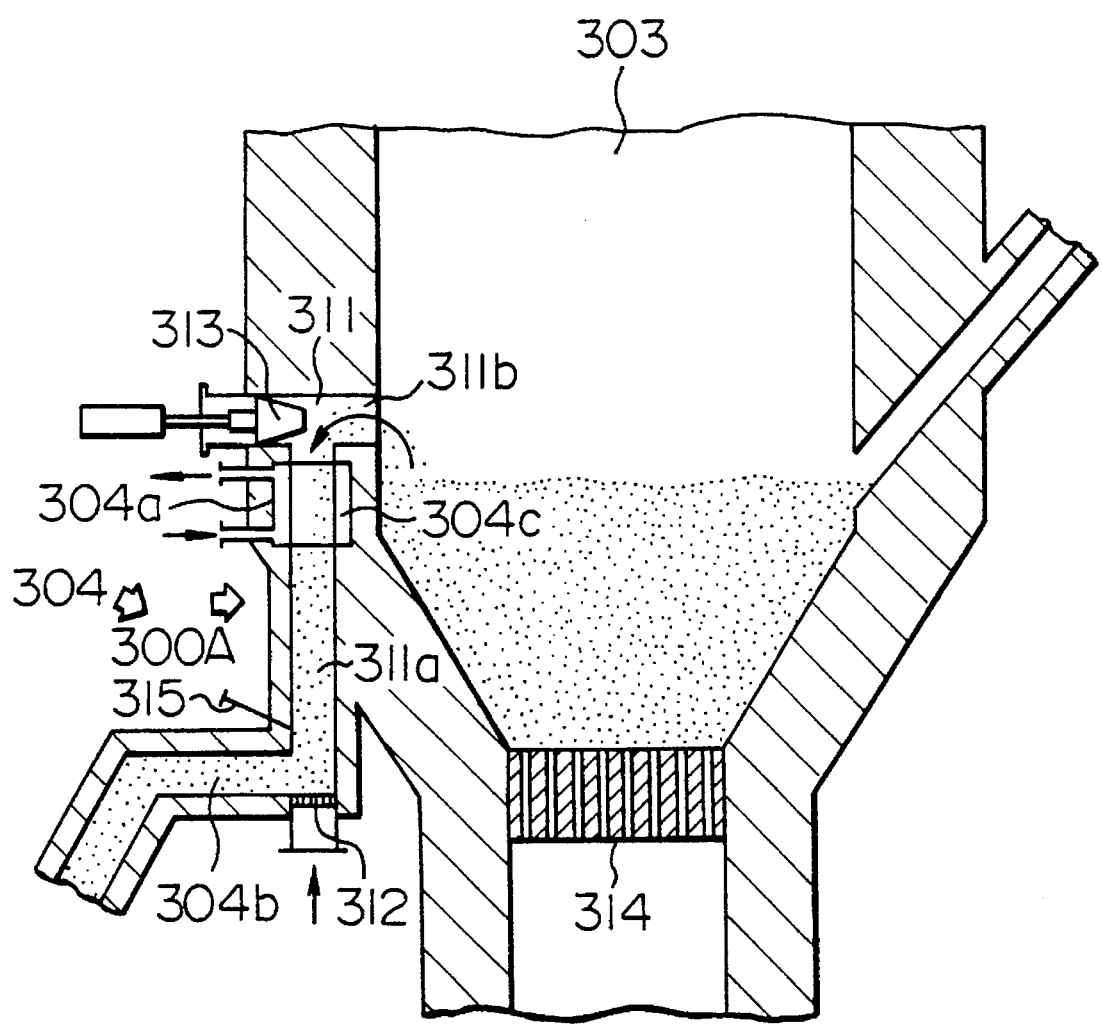
FIG. 13 is a cross sectional view which illustrates an essential portion of another embodiment.
Figure 14:
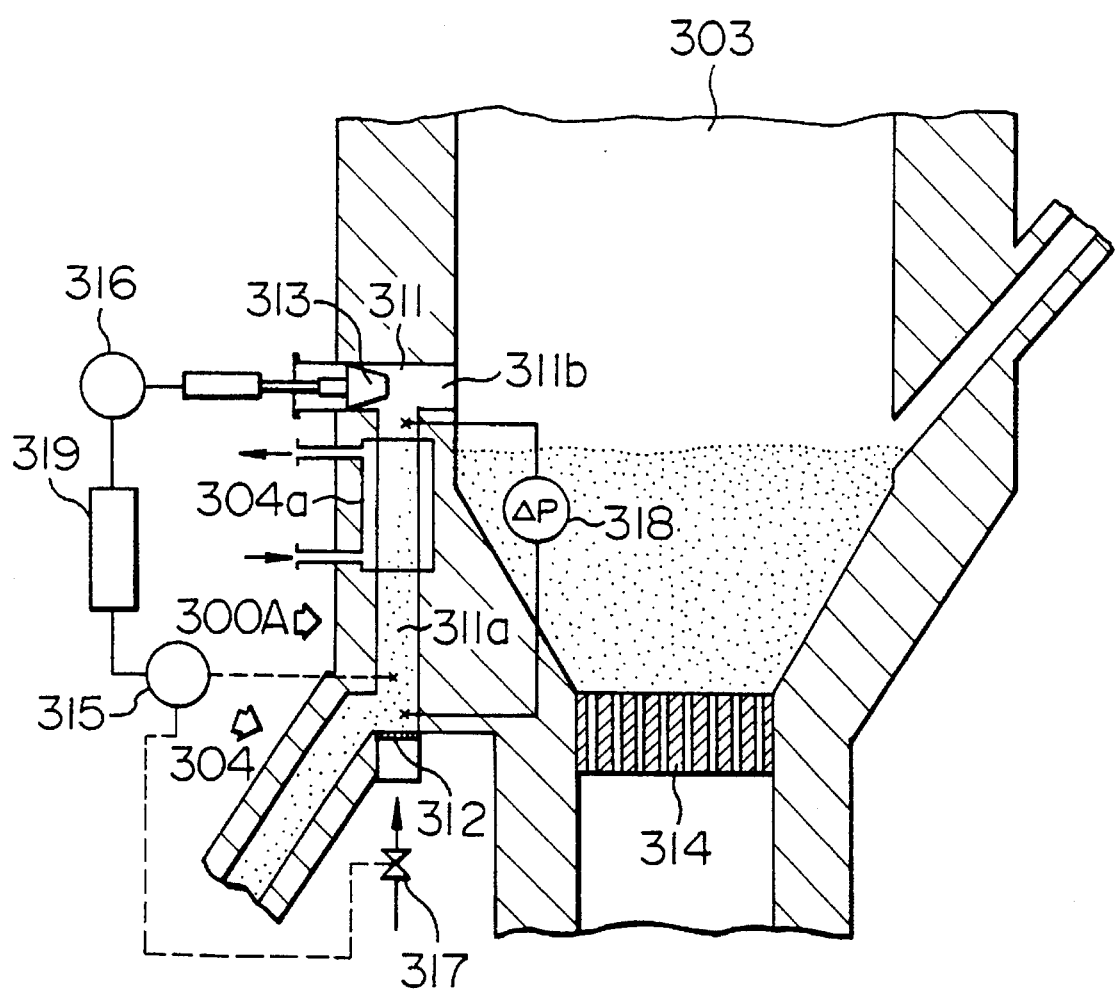
FIG. 14 is a cross sectional view which illustrates an essential portion of an embodiment comprising an automatic control mechanism.
Figure 15:
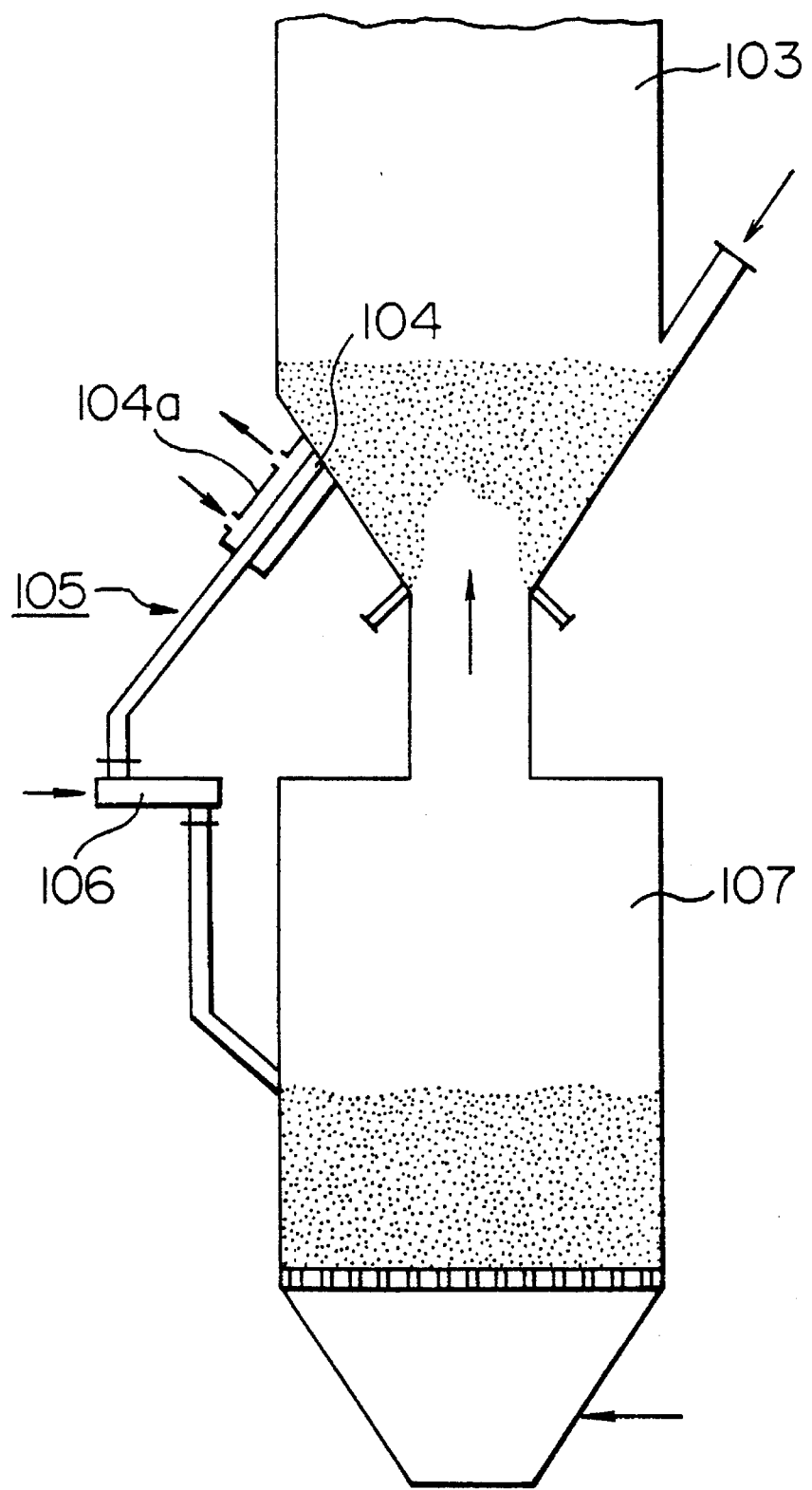
FIG. 15 is a vertical cross sectional view which illustrates a structure for discharging granules from a conventional cement clinker granulating furnace to a fluidized bed sintering furnace.

FIG. 11 is a schematic view which illustrates a fluidized bed cement sintering apparatus, FIG. 12 is a cross sectional view which illustrates an essential portion of the apparatus, FIG. 13 is a cross sectional view which illustrates an essential portion of another embodiment of this aspect, and FIG. 14 is a cross sectional view which illustrates an essential portion of a structure having an automatic control mechanism.

The overall system of the apparatus will now be described with reference to FIG. 11. Reference numeral 301 represents a suspension pre-heater. The suspension pre-heater 301 comprises cyclones $300C_1$, $300C_2$ and $300C_3$. Raw material for cement injected into the system through a raw material injection chute 302 is pre-heated when it is allowed to pass through the cyclones $300C_1$, $300C_2$ and $300C_3$, and then it is injected into the spouted type fluidized bed granulating furnace 303. The granules fluidized and granulated in the granulating furnace are discharged through on overflow discharge port, and allowed to pass through a discharge chute 304 and an L-valve (the hermetic discharge apparatus) 305 so as to be injected into a fluidized bed sintering furnace 306. In the sintering furnace 306, the granules are sintered, and allowed pass through a fluidized bed cooler 307 and a moving bed cooler 308 so as to be recovered as cement clinker. Reference numeral 309 represents a pulverized coal fuel supply line, and 310 represents a heavy oil burner.

Referring to FIG. 12, the fourth aspect of the present invention will now be described in detail. An overflow discharge port 311 having a T-shape cross sectional shape is formed on one side of the granulating furnace 303. Further, the top end of the discharge chute 304 for discharging the granules is connected to a vertical hole portion 311a of the overflow discharge port 311. A cooling chute portion 304a formed into an air or water cooling jacket shape and having an inclination end projecting over the outer surface of the furnace is disposed at the top end of the discharge chute 304. Further, a chute portion 304b having a T-shape cross section and formed into a heat insulating structure is formed to be connected to the inclination end of the cooling chute portion 304a. In addition, a distributor 312 formed into a perforated structure is disposed on the bottom wall of the vertical portion of the chute portion 304b. As a result, cooling air is blown from an outside portion of the distributor 312 into the chute portion 304b in a direction designated by an arrow so that the granules are fluidized and cooled. The chute portion 304b and the distributor 312 form a small-size fluidized bed cooling structure 300A.

A horizontal hole portion 311b at a position opposing the overflow discharge port 311 has a plug 313 which reciprocated in the horizontal direction by a manual or control means. The movement of the plug 313 adjusts the degree of opening of the overflow discharge port 311 to adjust the degree of mixture of granules in the bed of the granulating furnace 303 and granules in the bed of the small size fluidized bed cooling structure 300A. If the height of the bed in the granulating furnace 303 is undesirably raised somewhat, the smooth discharge of the granules can be maintained. Even if the granules are deposited or allowed to adhere to the overflow discharge port 311, the granules can easily be overcome when the plug 313 is moved. Although this embodiment is arranged in such a manner that the granulating furnace 303 is formed into the spouted bed type fluidized bed structure, this embodiment may be adapted to a spouted bed type furnace. Therefore, the granulating furnace 303 is not limited to the illustrated structure.

FIG. 13 illustrates modifications of the cooling chute portion 304a and the small size fluidized bed cooling structure 300A shown in FIG. 12. The vertical portion of the chute portion 304b forming the small size fluidized bed cooling structure 300A is integrated with the vertical hole portion 311a of the overflow discharge port 311. Further, a cooling jacket 304c is disposed in the vertical hole portion 311a. Reference numeral 315 represents a thermometer.

FIG. 14 illustrates a structure shown in FIG. 13 and arranged in such a manner that the pressure difference $\Delta P$ between the top end of the vertical hole portion 311a of the overflow discharge port 311 and a position adjacent to the distributor 312 is measured. If the pressure difference $\Delta P$ is larger than a predetermined difference and the temperature of the bed of the small size fluidized bed cooling structure 300A is higher than a standard temperature, a motor 316 is rotated to shift the plug 313 in the closing direction. As described above, the shift of the plug in the closing direction is adjusted to realize the standard temperature. If the pressure difference $\Delta P$ is smaller than a predetermined difference, the plug 313 is moved into the opening direction. If the pressure difference ΔP is within a predetermined level, the opening operation is stopped. Further, the pressure difference ΔP is made to be the predetermined difference and the bed temperature of the small size fluidized bed cooling structure 300A measured by the thermometer 315 is made to be 1200° C. or lower by adjusting the degree of opening of the valve 317 to control the quantity of fluidizing and cooling air. However, the quantity of fluidizing and cooling air is not made to be smaller than the minimum fluidized velocity of the granules in the small size fluidized bed cooling structure 300A. Reference numeral 318 represents a pressure difference meter, and 319 represents a control unit.

As described above, the structure of the fourth aspect of the present invention enables the following effects to be obtained.

(a) Raw material powder for cement supplied to the granulating furnace can be granulated. The obtained granules can be injected into the sintering furnace by way of the discharge chute so as to be sintered so that cement clinker is continuously manufactured.

(b) The granules granulated in the granulating furnace are discharged by the overflow means and are passed to the small size fluidized bed cooling structure having the means for fluidizing and cooling the granules formed in the discharge chute. Therefore, the granules discharged due to overflow can uniformly and assuredly be cooled to temperature (1200° C. or lower) at which generation of the liquid phase can be prevented. Therefore, the mutual adhesion of granules and adhesion of granules to the wall surface of the chute can be completely prevented. Therefore, the granules can be smoothly supplied to the sintering furnace.

(c) Since a portion of the overflow discharge chute is formed vertically, mixture of cooled granules in the small size fluidized bed cooling structure and hot granules in the granulating furnace can be rationally prevented. Therefore, granules can be efficiently fluidized and cooled in the small size fluidized bed cooling structure. As a result, granules can be smoothly discharged, and sensible heat of the cooling medium in the small size fluidized bed cooling structure can be recovered by an apparatus for previously heating raw material disposed in the ensuing stream. Therefore, the heat efficiency can be maintained.

Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. A method of sintering cement clinker comprising:

introducing raw material for cement to a spouted fluidized bed granulating furnace which includes a perforated distributor having a plurality of nozzle holes;

passing fluidizing gas through at least one of said plurality of nozzle holes into said spouted fluidized bed granulating furnace while simultaneously blowing classifying gas at a selected flow velocity that is different from the flow velocity of said fluidizing gas into said spouted fluidized bed granulating furnace through a dropping port arranged facing and between the fluidized bed of said spouted fluidized bed granulating furnace and in communication with a fluidized bed sintering furnace;

granulating said raw material in said spouted fluidized bed granulating furnace;

discharging granules formed in said spouted fluidized bed granulating furnace into said fluidized bed sintering furnace while classifying said granules with said classifying gas; and sintering the granules injected into the fluidized bed sintering furnace through said dropping port.

2. A method of sintering cement clinker according to claim 1, wherein said classifying gas is gas discharged from said fluidized bed sintering furnace.

3. A method of sintering cement clinker according to claim 1 wherein the flow velocity of the classifying gas is selected to correspond to a specified size granule.

* * * * *